US006026184A

United States Patent [19]

Fukushima

[11] Patent Number: 6,026,184

[45] Date of Patent: Feb. 15, 2000

[54] IMAGE PROCESSOR FOR RESTORING BI-LEVEL PIXEL DATA TO MULTI-LEVEL PIXEL DATA

[75] Inventor: Shigenobu Fukushima, Yokohama, Japan

[73] Assignee: Minolta Co., Ltd., Osaka, Japan

[21] Appl. No.: 07/895,806

[22] Filed: Jun. 9, 1992

[30] Foreign Application Priority Data

| | | | |
|---|---|---|---|
| Jun. 10, 1991 | [JP] | Japan | P3-137975 |
| Jun. 10, 1991 | [JP] | Japan | P3-137985 |
| Jun. 10, 1991 | [JP] | Japan | P3-137988 |
| Jun. 10, 1991 | [JP] | Japan | P3-137996 |
| Jun. 10, 1991 | [JP] | Japan | P3-137998 |

[51] Int. Cl.[7] ................................ G06K 9/48; H04N 1/40

[52] U.S. Cl. .......................... 382/199; 382/260; 382/299; 358/456; 358/455

[58] Field of Search ................................ 382/22, 54, 52, 382/199, 266, 260, 194, 299; 358/455, 456, 457, 429, 452

[56] References Cited

U.S. PATENT DOCUMENTS

| | | | |
|---|---|---|---|
| 4,903,142 | 2/1990 | Hasebe et al. | 358/458 |
| 4,903,316 | 2/1990 | Hongo et al. | 382/52 |
| 5,023,919 | 6/1991 | Wataya | 382/56 |
| 5,058,181 | 10/1991 | Ishihara et al. | 382/22 |
| 5,125,045 | 6/1992 | Murakami et al. | 358/456 |
| 5,200,841 | 4/1993 | Kotaki et al. | 358/453 |
| 5,231,677 | 7/1993 | Mita et al. | 382/22 |
| 5,311,328 | 5/1994 | Murata | 358/463 |

FOREIGN PATENT DOCUMENTS

| | | | |
|---|---|---|---|
| 58-75372 | 5/1983 | Japan | H04N 1/40 |
| 62-107573 | 5/1987 | Japan | H04N 1/40 |
| 62-114377 | 5/1987 | Japan | H04N 1/40 |
| 62-114378 | 5/1987 | Japan | H04N 1/40 |
| 63-11832 | 3/1988 | Japan | H04N 1/40 |
| 2-165775 | 6/1990 | Japan | H04N 1/40 |
| 3-157060 | 7/1991 | Japan | H04N 1/40 |
| 2170373 | 7/1986 | United Kingdom | H04N 1/40 |

OTHER PUBLICATIONS

Yoshinobu Mita et al., "High Fine Multi–Value Recovery of Binary Image by Neural Network", Japan Hard Copy, '90, NIP–24, pp. 233–236, 1990.

*Primary Examiner*—Jose L. Couso
*Assistant Examiner*—Matthew C. Bella
*Attorney, Agent, or Firm*—Burns, Doane, Swecker & Mathis, LLP

[57] ABSTRACT

When a multi-level image is recovered from a pseudo-half-tone bi-level image, a smoothing component and an edge emphasis component obtained on pixels around a specified pixel to be recovered is mixed. The edge emphasis is performed only when the monority pixels exist around the specified pixel. As to the edge emphasis, a narrow line is recovered by using a pair of windows of width of one pixel of the two sides in the edge emphasis direction to obtain an edge emphasis component of width of one pixel in the edge emphasis direction. As to the mixing, the size of the windows for smoothing and the size for the edge emphasis are made almost equal to each other. In order to prevent erroneous edge detection, edge emphasis is judged by using a region including the specified pixel and another without the specified pixel. Erroneous detection of an image of high spatial frequencies can be prevented by using four detection regions.

32 Claims, 38 Drawing Sheets

| | j=0 | 1 | 2 | 3 | 4 | 5 | 6 | 7 | 8 |
|---|---|---|---|---|---|---|---|---|---|
| i=0 | P00 | P01 | P02 | P03 | P04 | P05 | P06 | P07 | P08 |
| 1 | P10 | P11 | P12 | P13 | P14 | P15 | P16 | P17 | P18 |
| 2 | P20 | P21 | P22 | P23 | P24 | P25 | P26 | P27 | P28 |
| 3 | P30 | P31 | P32 | P33 | P34 | P35 | P36 | P37 | P38 |
| 4 | P40 | P41 | P42 | P43 | P44 | P45 | P46 | P47 | P48 |
| 5 | P50 | P51 | P52 | P53 | P54 | P55 | P56 | P57 | P58 |
| 6 | P60 | P61 | P62 | P63 | P64 | P65 | P66 | P67 | P68 |
| 7 | P70 | P71 | P72 | P73 | P74 | P75 | P76 | P77 | P78 |
| 8 | P80 | P81 | P82 | P83 | P84 | P85 | P86 | P87 | P88 |

*Fig. 9*

| | 0 | 1 | 2 | 3 | 4 | 5 | 6 | 7 | 8 |
|---|---|---|---|---|---|---|---|---|---|
| 0 | | | | | | | | | |
| 1 | | | | | | | | | |
| 2 | | | | | | | | | |
| 3 | | | | | -1 | | | | |
| 4 | | | | -1 | * 4 | -1 | | | |
| 5 | | | | | -1 | | | | |
| 6 | | | | | | | | | |
| 7 | | | | | | | | | |
| 8 | | | | | | | | | |

| | 0 | 1 | 2 | 3 | 4 | 5 | 6 | 7 | 8 |
|---|---|---|---|---|---|---|---|---|---|
| 0 | | -1 | -1 | -1 | -1 | -1 | -1 | -1 | |
| 1 | -1 | 2 | 1 | 1 | 1 | 1 | 1 | 2 | -1 |
| 2 | -1 | 1 | | | | | | 1 | -1 |
| 3 | -1 | 1 | | | | | | 1 | -1 |
| 4 | -1 | 1 | | | * | | | 1 | -1 |
| 5 | -1 | 1 | | | | | | 1 | -1 |
| 6 | -1 | 1 | | | | | | 1 | -1 |
| 7 | -1 | 2 | 1 | 1 | 1 | 1 | 1 | 2 | -1 |
| 8 | | -1 | -1 | -1 | -1 | -1 | -1 | -1 | |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 | -1 | -1 | -1 | 1 | 1 | 1 |   |   |   |
| 2 | -1 | -1 | -1 | 1 | 1 | 1 |   |   |   |
| 3 | -1 | -1 | -1 | 1 | 1 | 1 |   |   |   |
| 4 | -1 | -1 | -1 | 1 | *1 | 1 |   |   |   |
| 5 | -1 | -1 | -1 | 1 | 1 | 1 |   |   |   |
| 6 | -1 | -1 | -1 | 1 | 1 | 1 |   |   |   |
| 7 | -1 | -1 | -1 | 1 | 1 | 1 |   |   |   |
| 8 |   |   |   |   |   |   |   |   |   |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   | 1 | 1 | 1 | -1 | -1 | -1 |
| 2 |   |   |   | 1 | 1 | 1 | -1 | -1 | -1 |
| 3 |   |   |   | 1 | 1 | 1 | -1 | -1 | -1 |
| 4 |   |   |   | 1 | *1 | 1 | -1 | -1 | -1 |
| 5 |   |   |   | 1 | 1 | 1 | -1 | -1 | -1 |
| 6 |   |   |   | 1 | 1 | 1 | -1 | -1 | -1 |
| 7 |   |   |   | 1 | 1 | 1 | -1 | -1 | -1 |
| 8 |   |   |   |   |   |   |   |   |   |

*Fig. 19*

| | 0 | 1 | 2 | 3 | 4 | 5 | 6 | 7 | 8 |
|---|---|---|---|---|---|---|---|---|---|
| 0 | | | | -1 | -1 | -1 | -1 | 1 | |
| 1 | | | -1 | -1 | -1 | -1 | 1 | 1 | 1 |
| 2 | | -1 | -1 | -1 | -1 | 1 | 1 | 1 | |
| 3 | -1 | -1 | -1 | -1 | 1 | 1 | 1 | | |
| 4 | -1 | -1 | -1 | 1 | *1 | 1 | | | |
| 5 | -1 | -1 | 1 | 1 | 1 | | | | |
| 6 | | 1 | 1 | 1 | | | | | |
| 7 | | 1 | 1 | | | | | | |
| 8 | | | | | | | | | |

*Fig. 20*

| | 0 | 1 | 2 | 3 | 4 | 5 | 6 | 7 | 8 |
|---|---|---|---|---|---|---|---|---|---|
| 0 | | | | | | | | 1 | |
| 1 | | | | | | | 1 | 1 | 1 |
| 2 | | | | | | 1 | 1 | 1 | -1 |
| 3 | | | | | 1 | 1 | 1 | -1 | -1 |
| 4 | | | | 1 | *1 | 1 | -1 | -1 | -1 |
| 5 | | | 1 | 1 | 1 | -1 | -1 | -1 | -1 |
| 6 | | 1 | 1 | 1 | -1 | -1 | -1 | -1 | |
| 7 | | 1 | 1 | -1 | -1 | -1 | -1 | | |
| 8 | | | | -1 | -1 | -1 | | | |

*Fig. 21*

| | 0 | 1 | 2 | 3 | 4 | 5 | 6 | 7 | 8 |
|---|---|---|---|---|---|---|---|---|---|
| 0 | | 1 | -1 | -1 | -1 | -1 | | | |
| 1 | 1 | 1 | 1 | -1 | -1 | -1 | -1 | | |
| 2 | | 1 | 1 | 1 | -1 | -1 | -1 | -1 | |
| 3 | | | 1 | 1 | 1 | -1 | -1 | -1 | -1 |
| 4 | | | | 1 | *1 | 1 | -1 | -1 | -1 |
| 5 | | | | | 1 | 1 | 1 | -1 | -1 |
| 6 | | | | | | 1 | 1 | 1 | |
| 7 | | | | | | | 1 | 1 | |
| 8 | | | | | | | | | |

*Fig. 22*

| | 0 | 1 | 2 | 3 | 4 | 5 | 6 | 7 | 8 |
|---|---|---|---|---|---|---|---|---|---|
| 0 | | 1 | | | | | | | |
| 1 | 1 | 1 | 1 | | | | | | |
| 2 | -1 | 1 | 1 | 1 | | | | | |
| 3 | -1 | -1 | 1 | 1 | 1 | | | | |
| 4 | -1 | -1 | -1 | 1 | *1 | 1 | | | |
| 5 | -1 | -1 | -1 | -1 | 1 | 1 | 1 | | |
| 6 | | -1 | -1 | -1 | -1 | 1 | 1 | 1 | |
| 7 | | | -1 | -1 | -1 | -1 | 1 | 1 | |
| 8 | | | | -1 | -1 | -1 | | | |

Fig. 23

| | 0 | 1 | 2 | 3 | 4 | 5 | 6 | 7 | 8 |
|---|---|---|---|---|---|---|---|---|---|
| 0 | | | | | | | | | |
| 1 | | | | | | | | | |
| 2 | | | | | | | | | |
| 3 | | -1 | -1 | -1 | -1 | -1 | -1 | -1 | |
| 4 | | 2 | 2 | 2 | *2 | 2 | 2 | 2 | |
| 5 | | -1 | -1 | -1 | -1 | -1 | -1 | -1 | |
| 6 | | | | | | | | | |
| 7 | | | | | | | | | |
| 8 | | | | | | | | | |

Fig. 24

| | 0 | 1 | 2 | 3 | 4 | 5 | 6 | 7 | 8 |
|---|---|---|---|---|---|---|---|---|---|
| 0 | | | | | | | | | |
| 1 | | | | -1 | 2 | -1 | | | |
| 2 | | | | -1 | 2 | -1 | | | |
| 3 | | | | -1 | 2 | -1 | | | |
| 4 | | | | -1 | *2 | -1 | | | |
| 5 | | | | -1 | 2 | -1 | | | |
| 6 | | | | -1 | 2 | -1 | | | |
| 7 | | | | -1 | 2 | -1 | | | |
| 8 | | | | | | | | | |

*Fig. 25*

| | 0 | 1 | 2 | 3 | 4 | 5 | 6 | 7 | 8 |
|---|---|---|---|---|---|---|---|---|---|
| 0 | | | | | | | | -1 | |
| 1 | | | | | | | -1 | 2 | -1 |
| 2 | | | | | | -1 | 2 | -1 | |
| 3 | | | | | -1 | 2 | -1 | | |
| 4 | | | | -1 | *2 | -1 | | | |
| 5 | | | -1 | 2 | -1 | | | | |
| 6 | | -1 | 2 | -1 | | | | | |
| 7 | | 2 | -1 | | | | | | |
| 8 | | | | | | | | | |

*Fig. 26*

| | 0 | 1 | 2 | 3 | 4 | 5 | 6 | 7 | 8 |
|---|---|---|---|---|---|---|---|---|---|
| 0 | | -1 | | | | | | | |
| 1 | -1 | 2 | -1 | | | | | | |
| 2 | | -1 | 2 | -1 | | | | | |
| 3 | | | -1 | 2 | -1 | | | | |
| 4 | | | | -1 | *2 | -1 | | | |
| 5 | | | | | -1 | 2 | -1 | | |
| 6 | | | | | | -1 | 2 | -1 | |
| 7 | | | | | | | -1 | 2 | |
| 8 | | | | | | | | | |

| | 0 | 1 | 2 | 3 | 4 | 5 | 6 | 7 | 8 |
|---|---|---|---|---|---|---|---|---|---|
| 0 | | | | -1 | -1 | -1 | -1 | | |
| 1 | | | -1 | -1 | -1 | -1 | -1 | | |
| 2 | | -1 | -1 | -1 | -1 | -1 | 1 | 1 | |
| 3 | -1 | -1 | -1 | -1 | -1 | 1 | 1 | 1 | 1 |
| 4 | -1 | -1 | -1 | -1 | *1 | 1 | 1 | 1 | 1 |
| 5 | -1 | -1 | -1 | 1 | 1 | 1 | 1 | 1 | |
| 6 | -1 | -1 | 1 | 1 | 1 | 1 | 1 | | |
| 7 | | 1 | 1 | 1 | 1 | 1 | | | |
| 8 | | | | 1 | 1 | | | | |

| | 0 | 1 | 2 | 3 | 4 | 5 | 6 | 7 | 8 |
|---|---|---|---|---|---|---|---|---|---|
| 0 | | | -1 | -1 | -1 | -1 | | | |
| 1 | | | -1 | -1 | -1 | -1 | -1 | | |
| 2 | | 1 | 1 | -1 | -1 | -1 | -1 | -1 | |
| 3 | 1 | 1 | 1 | 1 | -1 | -1 | -1 | -1 | -1 |
| 4 | 1 | 1 | 1 | 1 | *1 | -1 | -1 | -1 | -1 |
| 5 | | 1 | 1 | 1 | 1 | 1 | -1 | -1 | -1 |
| 6 | | | 1 | 1 | 1 | 1 | 1 | -1 | -1 |
| 7 | | | | 1 | 1 | 1 | 1 | 1 | |
| 8 | | | | | 1 | 1 | | | |

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   |   |   |   |   |   |   |   |
| 2 |   |   |   |   |   |   |   |   |   |
| 3 |   | -1 | -1 | -1 | -1 | -1 | -1 | -1 |   |
| 4 |   | -1 | -1 | -1 | *-1 | -1 | -1 | -1 |   |
| 5 |   | 1 | 1 | 1 | 1 | 1 | 1 | 1 |   |
| 6 |   | 1 | 1 | 1 | 1 | 1 | 1 | 1 |   |
| 7 |   |   |   |   |   |   |   |   |   |
| 8 |   |   |   |   |   |   |   |   |   |

Rows 3–4: Wa ; Rows 5–6: W

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   |   | -1 | -1 | 1 | 1 |   |   |   |
| 2 |   |   | -1 | -1 | 1 | 1 |   |   |   |
| 3 |   |   | -1 | -1 | 1 | 1 |   |   |   |
| 4 |   |   | -1 | -1 | *1 | 1 |   |   |   |
| 5 |   |   | -1 | -1 | 1 | 1 |   |   |   |
| 6 |   |   | -1 | -1 | 1 | 1 |   |   |   |
| 7 |   |   | -1 | -1 | 1 | 1 |   |   |   |
| 8 |   |   |   |   |   |   |   |   |   |

Columns 2–3: Wa ; Columns 4–5: W

Fig. 38

| | 0 | 1 | 2 | 3 | 4 | 5 | 6 | 7 | 8 |
|---|---|---|---|---|---|---|---|---|---|
| 0 | | | | | | | | | |
| 1 | -1 | -1 | -1 | -1 | 1 | 1 | 1 | 1 | |
| 2 | -1 | -1 | -1 | -1 | 1 | 1 | 1 | 1 | |
| 3 | -1 | -1 | -1 | -1 | 1 | 1 | 1 | 1 | |
| 4 | -1 | -1 | -1 | -1 | * 1 | 1 | 1 | 1 | |
| 5 | -1 | -1 | -1 | -1 | 1 | 1 | 1 | 1 | |
| 6 | -1 | -1 | -1 | -1 | 1 | 1 | 1 | 1 | |
| 7 | -1 | -1 | -1 | -1 | 1 | 1 | 1 | 1 | |
| 8 | | | | | | | | | |

202

IMAGE PROCESSOR FOR RESTORING BI-LEVEL PIXEL DATA TO MULTI-LEVEL PIXEL DATA

BACKGROUND OF THE INVENTION

1. Field of the Invention

The present invention relates to an image processing apparatus having a recovery circuit for recovering bi-level pseudo-half tone image data, including bi-level image data obtained with a pseudo-half tone binarizing method or with an ordinary binarizing method, to a multi-level image data.

2. Description of the Prior Art

Usually, bi-level printers which reproduce a bi-level image data are used. Further, recently, there has been put into practice a color laser printer for recording an image of multi-level image data at a high speed and with a high resolution.

Multi-level data of a half-tone image such as a photograph are expressed as multi-level data of a plurality of bits per pixel. However, a large capacity of memory is needed to store such a multi-level image data.

In order to solve the above problem, the following method is suggested. Namely, the multi-level image data are converted into bi-level image data, and then, the converted bi-level image data are stored in the storage unit. Furthermore, upon processing the bi-level image data or recording the bi-level image data, after reading out the above bi-level image data from the storage unit, multi-level image data are recovered from the bi-level image data.

This type of recovery of bi-level data of pseudo-half-tone image to multi-level image data has an advantage that when a pseudo-half-tone image is reproduced by a multi-level printer or a multi-level display, the recovered multi-level image data can make use of the gradation output of the output apparatus effectively.

Further, the recovery has another advantage. That is, when a pseudo-half-tone bi-level data is outputted (recorded or displayed) at a different pixel density, magnification change is performed not with a simple magnification processing, but after the recovery to multi-level data. This can prevent the generation of Moire patterns due to the periodicity of the original pseudo-half-tone bi-level data. The recovered multi-level data is processed with a pseudo-half-tone method and then is sent to an output apparatus. Then, if the output system has a higher density than the original image data, the high density characteristic of the output system can be used effectively.

Further, the two advantages can be combined to output multi-level data after the magnification is changed.

The method and apparatus of this type are disclosed in the Japanese patent laid-open publications Nos. 62-114378/1987 and 62-107573/1987.

The image processing method disclosed in the Japanese patent laid-open publications No. 62-114378/1987 intends to make the best use of a multi-level printer even for bi-level image data as well as to improve the quality of recovered character image and includes the following steps: (a) recovering a half-tone image from the inputted bi-level image data; and (b) performing predetermined processes such as a magnification and reduction process, an image emphasis process or the like for the recovered half-tone image. In this method, in order to recover multi-level image data from bi-level image data, a window in a square shape having a predetermined size is provided close to a specified pixel to be recovered, and then, a smoothing process is performed for the inputted image data within the provided window.

Further, the image processing apparatus disclosed in Japanese patent laid-open publications No. 62-107573/1987 intends to prevent the quality of image from deteriorating in the case of using a binarizing circuit having a simple structure using a dither method or the like and also to constitute the image processing apparatus with simple circuits and comprises the following means: (a) dividing means for dividing binarized image information into predetermined blocks; (b) judging means for judging the image tone by each block; and (c) converting means for converting the binarized image information within the block into multi-level image data according to the judgment result thereof. In this apparatus, upon transmitting image data and storing them, there are used bi-level image data so as to display and edit them more efficiently. Further, upon reproducing the image, there is used a multi-level representation close to an analogue image. Concretely, the judgment means is constituted by an image judgment table ROM for judging the image tone using a pattern matching method within each block corresponding to a size of a dither matrix, and the converting means is constituted by a conversion ROM.

When a multi-level image is recovered from a pseudo-half-tone bi-level image, the mixing of a smoothing component obtained by a window for smoothing and an edge emphasis component obtained by a window for edge emphasis on pixels around a specified pixel to be processed can be used.

In this case, when an edge emphasis component is obtained as to a direction, an edge component (edge emphasis amount) is detected from a difference of the numbers of pixels in two pixel blocks (windows). However, an edge may be detected erroneously in a different direction if a pixel which is relatively far from the specified pixel is included in a window for edge emphasis, or especially if a separate pixel exists in a direction different from the direction for edge emphasis. Therefore, an image which should be smoothed may be emphasized or a negative emphasis may be emphasized positively, so that correct recovery of an original multi-level image is not realized.

Though a half-tone image is usually an image of frequencies lower than a period of two pixels, an original image of a straight line of width of one pixel may be binarized with a pseudo-half tone binarizing method. In this case, if a window of width larger than one pixel in the direction of edge emphasis is used, the original image may become a dashed line of width of one pixel or more or the density of the bi-level image may disperse. Thus, an edge emphasis component cannot be obtained and the original image cannot be recovered.

A window of wider width is favorable in order to get an image smoothed more, while a window of narrower width is needed in order to get an edge emphasis component of an image of higher frequencies. However, if the sizes of the windows for detecting a smoothing component and an edge emphasis component are different from each other, the effect of the larger window becomes larger.

SUMMARY OF THE INVENTION

An object of the present invention is to provide an image processor which can recover bi-level image data, including bi-level image data obtained with a pseudo-half tone binarizing method or with an ordinary binarizing method, to multi-level image data while reducing erroneous judgement of edge emphasis component due to minority pixels.

Another object of the present invention is to provide an image processor which can recover bi-level image data of a narrow line to multi-level image data.

A third object of the present invention is to provide an image processor which can recover bi-level image data, including bi-level image data obtained with a pseudo-half tone binarizing method or with an ordinary binarizing method with a threshold value, to multi-level image data without excess smoothing.

A fourth object of the present invention is to provide an image processor which can recover bi-level image data, including bi-level image data obtained with a pseudo-half tone binarizing method or with an ordinary binarizing method with a threshold value, to multi-level image data while reducing erroneous judgements of the edge region.

A fifth object of the present invention is to provide an image processor which can recover bi-level image data, including bi-level image data obtained with a pseudo-half tone binarizing method or with an ordinary binarizing method with a threshold value, to multi-level image data while reducing erroneous judgements of the edge region of an image of high spatial frequencies.

In order to solve the aforementioned objects, in one aspect of the present invention, an edge amount in correspondence to the density difference between a specified pixel to be recovered and other pixels surrounding the specified pixel is detected according to the data of the pixel and the surrounding pixels among the bi-level image data, and minority pixels in the bi-level image data in a first prescribed region including the specified pixels judged. Then, it is judged whether the minority pixels are included in a second prescribed region and the detected edge amount is made invalid if the minority pixels are not included in the second prescribed region. That is, edge emphasis is performed only when the minority pixels exist around the specified pixel.

In a second aspect of the present invention, an edge amount in correspondence to the density difference between a specified pixel to be recovered and other pixels surrounding the specified pixel is detected according to the data of pixels surrounding the specified pixel in the bi-level image data, and it is judged whether the data of all pixels of a prescribed area including the specified pixel are the same. The detected edge amount is made invalid if all the data in the prescribed area are the same.

In a third aspect of the present invention, the number of black pixels in a window including a specified pixel to be recovered and other pixels surrounding the specified pixel in the bi-level image data is counted to get a smoothing component. By using a plurality of two sets of window pairs, which window pairs including a window pair of width of one pixel, an edge amount is detected from the difference of the number of black pixels in the two of windows including the specified pixel. Then, a multi-level image is recovered according to the obtained smoothing component and the edge amount.

In a fourth aspect of the present invention, the number of black pixels in a first window including a specified pixel to be recovered and other pixels surrounding the specified pixel in the bi-level image data is calculated to get a smoothing component, and this calculation is performed on the pixels apart at most Ni pixels from the specified pixel. On the other hand, an edge amount is detected from the difference of the number of black pixels of two second windows including the specified pixel, and this detection is performed on the pixels apart at most N2 pixels from the specified pixel, wherein N1 is almost equal to N2. Then, a multi-level image is recovered by mixing the smoothing component and the edge amount.

In a fifth aspect of the present invention, the number of prescribed image data included in a first region including pixels surrounding a specified pixel to be recovered in the bi-level image data is counted, and it is judged whether the data of the pixels included in the first region are the same. On the other hand, the number of prescribed image data included in a second region including other pixels surrounding the specified pixel, which other pixels being not included in the first region surrounding the specified pixel in the bi-level image data is counted, and it is judged whether the data of the pixels included in the second region are the same. If the difference between the two counted numbers is larger than a threshold value and if the pixels in either of the two regions are the same, the data of the specified pixel is processed to emphasize the density difference.

In a sixth aspect of the present invention, the difference is detected between the number of prescribed pixel data included in a first region including a specified pixel to be recovered and pixels surrounding the specified pixel in a prescribed first direction as to the first pixel and the number of the prescribed pixel data included in a second region adjacent to the first region in a direction opposite to the prescribed first direction. Further, the difference is detected between the number of the prescribed pixel data included in a third region including the specified pixel and pixels surrounding the specified pixel in a prescribed second direction and the number of prescribed pixel data included in a fourth region adjacent to the third region in a direction opposite to the prescribed second direction. Then, an edge region is detected according to the two detected differences, and the data of the specified pixel is emphasized according to the result of edge detection result.

An advantage of the present invention is that erroneous detection of edge can be prevented especially when a separate pixel exists in a direction different from the direction for edge emphasis.

Another advantage of the present invention is that a multi-level image of a narrow line can be recovered from a bi-level image obtained by the pseudo-half-tone binarizing method.

A third advantage of the present invention is that excess smoothing can be prevented.

A fourth advantage of the present invention is that erroneous judgements of the edge region can be reduced.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 9 is a diagram of a Laplacian filter for an edge emphasis;

FIG. 19 is a diagram of a fifth spatial filter used for calculating edge emphasis amount;

FIG. 20 is a diagram of a sixth spatial filter used for calculating edge emphasis amount;

FIG. 21 is a diagram of a seventh spatial filter used for calculating edge emphasis amount;

FIG. 22 is a diagram of an eighth spatial filter used for calculating edge emphasis amount;

FIG. 23 is a diagram of an eleventh spatial filter used for calculating edge emphasis amount;

FIG. 24 is a diagram of a twelfth spatial filter used for calculating edge emphasis amount;

FIG. 25 is a diagram of a thirteenth spatial filter used for calculating edge emphasis amount;

FIG. 26 is a diagram of a fourteenth spatial filter used for calculating edge emphasis amount;

FIG. 33 is a diagram of a twenty third spatial filter used for edge region judgement;

FIG. 34 is a diagram of a twenty fourth spatial filter used for edge region judgement;

FIG. 38 is a diagram of an example of a spatial filter for edge region detection;

DETAILED DESCRIPTION OF THE PREFERRED EMBODIMENTS

Facsimile apparatuses of an embodiment according to the present invention will be described below with reference to the attached drawings. The facsimile apparatus comprises an image recovery processor 62 for recovering multi-level image data from received bi-level image data and a laser printer 70 of a so-called multi-level printer for printing each pixel with a multi-number of gradation stages.

The facsimile apparatus will be described in an order of the following items.

Figure 2:
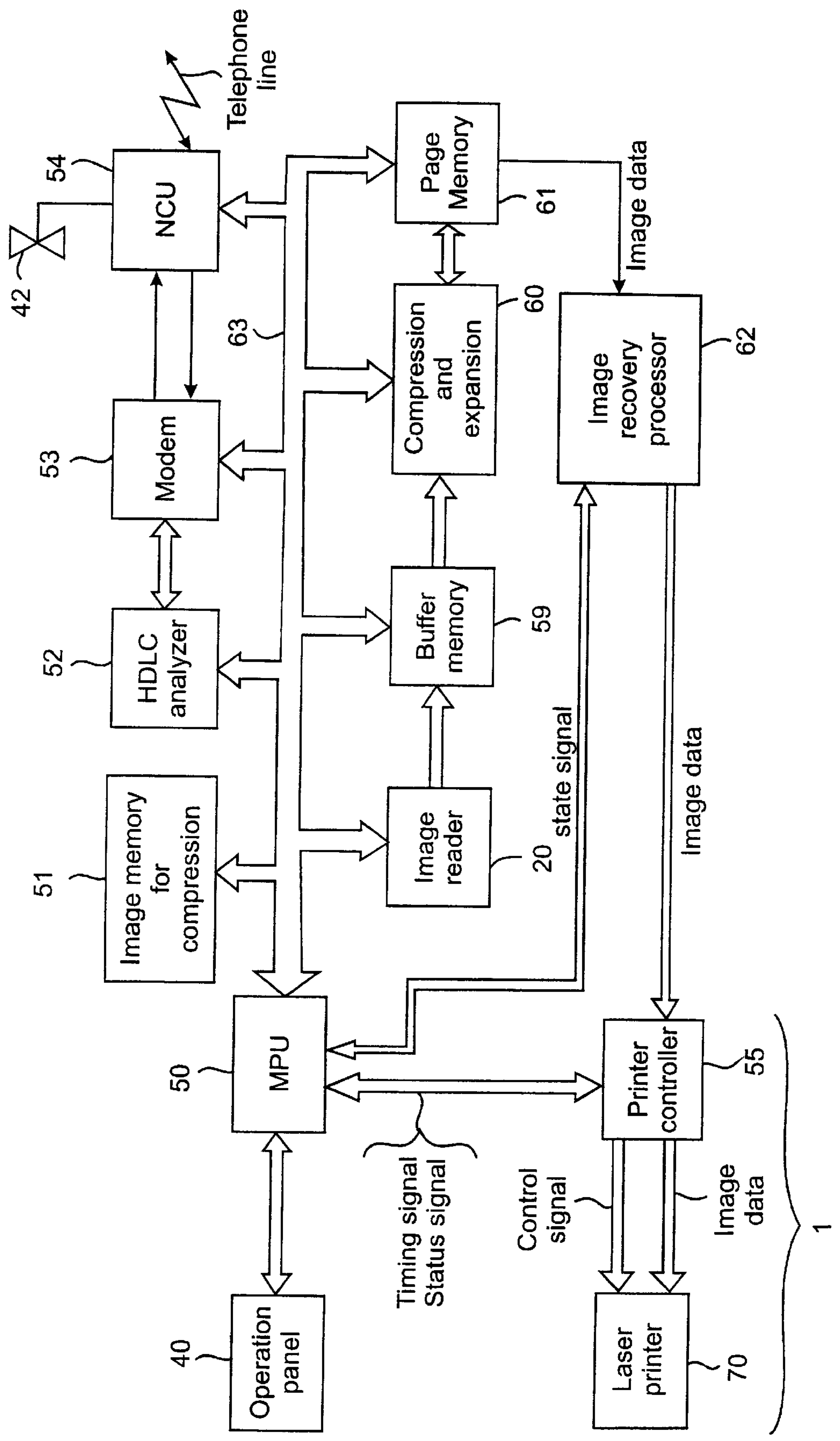
FIG. 2 is a schematic block diagram of a signal processing section of the facsimile apparatus shown in FIG. 1.

(1) Features of preferred embodiment (2) Composition and action of facsimile apparatus (3) Image recovery processor (4) 9×9 Matrix memory (5) Half-tone data recovery section (5-1) Windows for edge emphasis and for smoothing (5-2) Half-tone data recovery section (5-3) Composition and action of respective sections (5-3-1) Edge region detection calculator (5-3-2) First edge component calculator (5-3-3) Second edge component calculator (5-3-4) Logic B circuit, logic C circuit, logic D circuit and logic E circuit (5-3-5) 3×3 Minority pixel detector (5-3-6) 7×7 Black pixel number counter The facsimile apparatus has an image recovery processor 62, as shown in FIG. 2, which recovers the inputted bi-level image data to a multi-level image data and has a laser printer 70 as a so-called multi-level printer. In the following, "half-tone image" means a pseudo-half-tone image data obtained by binarizing a multi-level image data of half-tone image such as a photograph with a pseudo-half-tone technique such as a dither method, and "half-tone region" means a region of the half-tone image. On the other hand, "nonhalf-tone image" means an image such as a character and "non-half-tone region" means a region of the non-half-tone image.

(1) FEATURES OF PREFERRED EMBODIMENT

Figure 3:
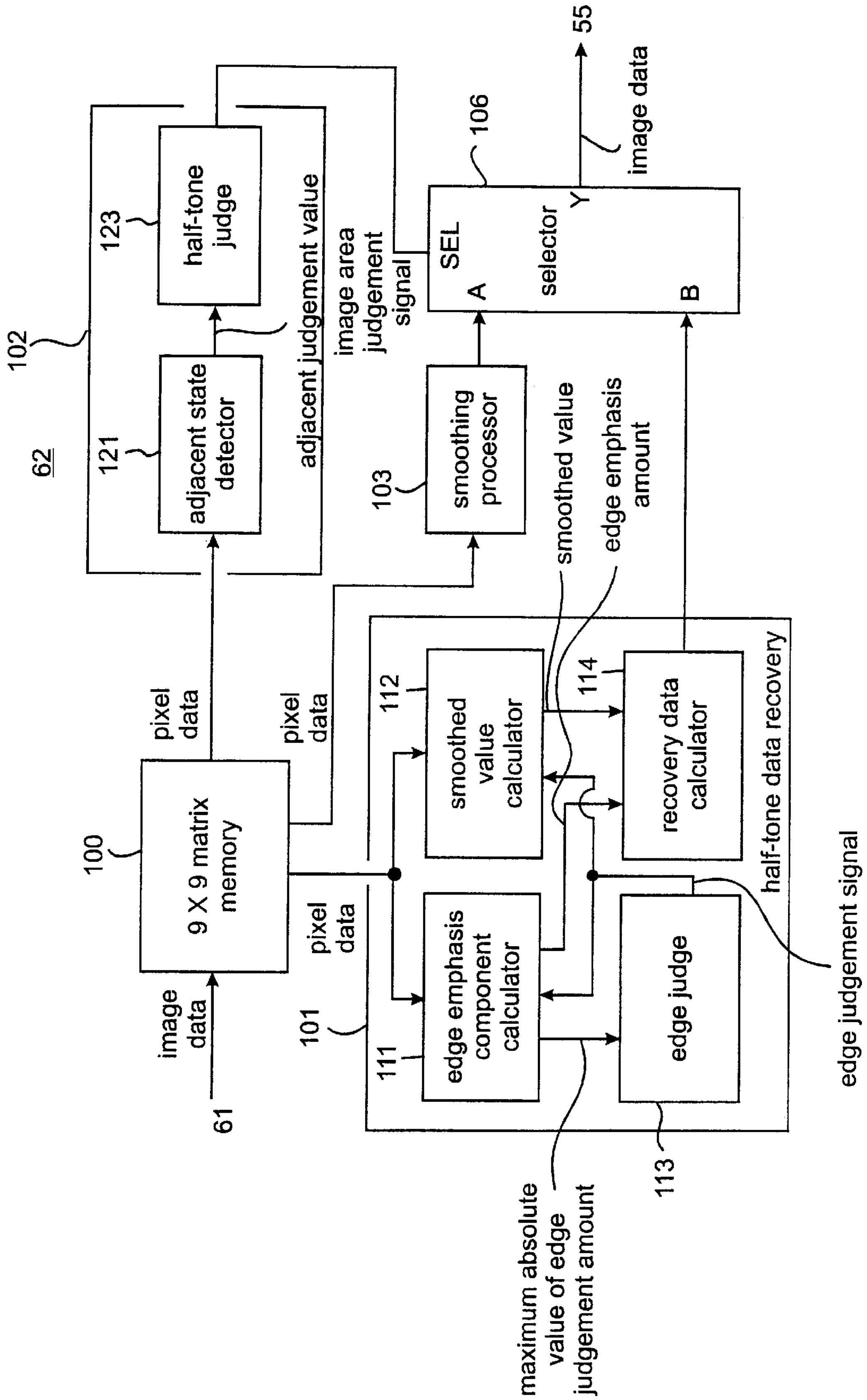
FIG. 3 is a schematic block diagram showing an image recovery processor shown in FIG. 2.

The facsimile apparatus of the preferred embodiment is characterized in comprising a half-tone data recovery section 101, an image area judgment processor 102 and a smoothing processor 103, as shown in the block diagram of FIG. 3.

The half-tone data recovery section 101 calculates a predetermined edge emphasis amount and a predetermined smoothed value based on received bi-level image data including bi-level image data binarized by the pseudo half-tone binarizing method and bi-level image data binarized by the non-half-tone binarizing method with a predetermined threshold value, generates an edge judgment signal, and then, recovers multi-level half-tone data.

The image area judgment processor 102 judges whether each specified pixel within each predetermined area, in the center of which the specified pixel to be recovered is located, is included in the half-tone area or in the non-half-tone area based on the received bi-level image data, and generates an image area judgment signal.

The smoothing processor 103 performs a smoothing processing based on the received bi-level image data.

When it is judged that the specified pixel is included in the half-tone area, the recovered half-tone data are outputted through a printer controller 55 to the multi-level laser printer 70. On the other hand, when it is judged that the specified pixel is included in the non-half-tone area, the bi-level image data outputted from the processor 103 are first converted to black or white data in the multi-level representation and then is outputted to the laser printer 70 in a similar manner.

In particular, the facsimile apparatus is characterized by the half-tone data recovery section 101 . The half-tone data recovery section 101 comprises an edge emphasis component calculator 111, a smoothed value calculator 112, an edge judge section 113 and a recovery data calculator 114. The edge emphasis component calculator 111 generates data of the maximum of the absolute values of the edge judgment amounts each representing an index for edge judgment based on inputted pixel data, and generates data of edge emphasis amount to be used upon performing an edge emphasis process within a predetermined area. The smoothed value calculator 112 calculates a smoothed value obtained by performing a smoothing process for pixel data within the predetermined area based on the inputted pixel data and the edge judgment signal. The edge judge section 113 generates an edge judgment signal based on the maximum of the absolute values of the edge judgment amounts. The recovery data calculator 114 recovers multi-level half-tone image data based on the edge emphasis amount and the smoothing amount.

(2) COMPOSITION AND ACTION OF FACSIMILE APPARATUS

Figure 1:
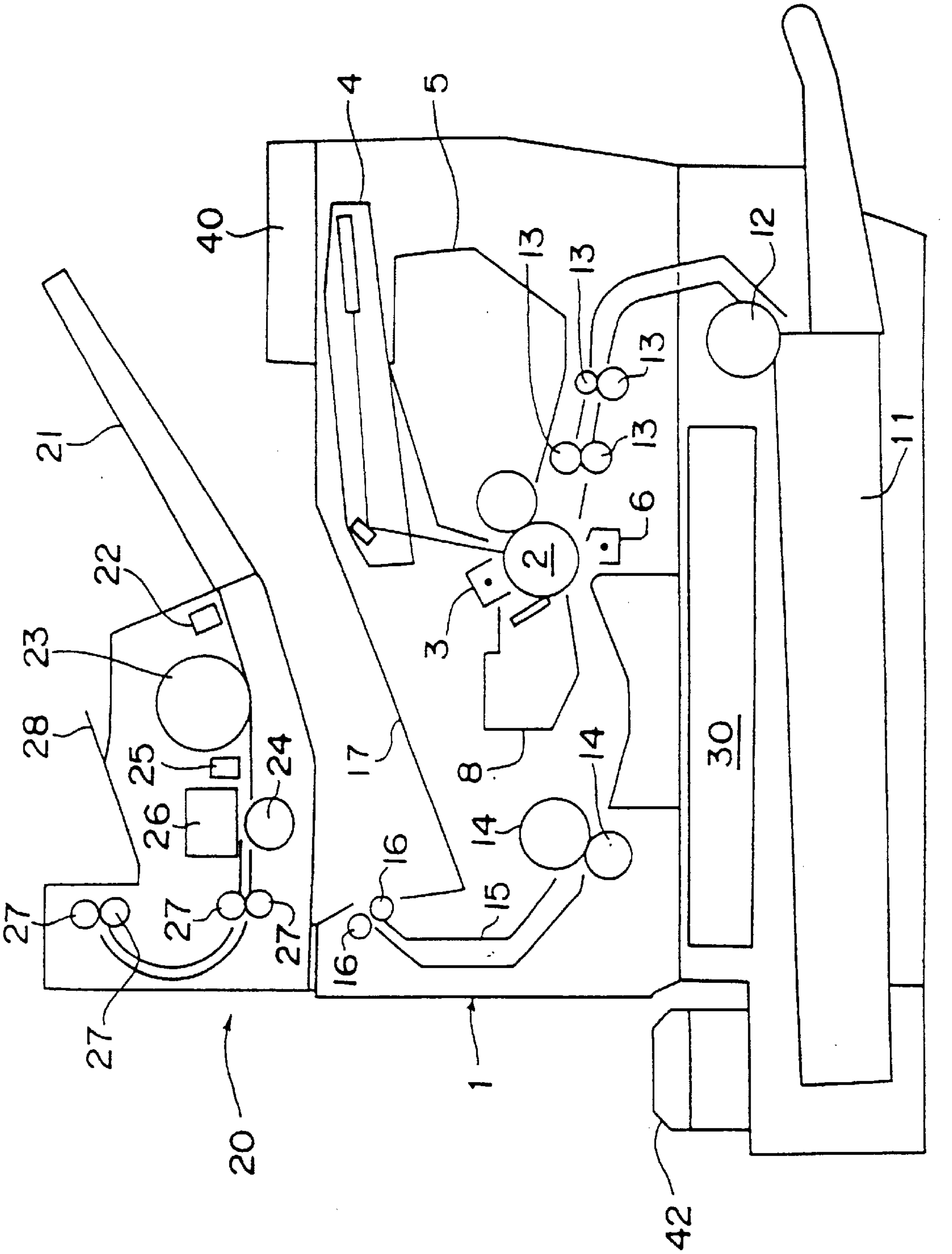
FIG. 1 is a longitudinal cross sectional view of a mechanical section of a facsimile apparatus of an embodiment according to the present invention.

FIG. 1 shows a mechanical section of the facsimile apparatus according to the present invention. As shown in FIG. 1, the facsimile apparatus is mainly divided into a printer section 1 and an image reader 20 provided on the printer section 1. An operational panel 40 is provided on the printer section 1, and a telephone 42 is provided on the side surface of the printer section 1.

Referring to FIG. 1, the printer section 1 is an electrophotographic laser printer having a structure similar to that of a conventional laser printer. The composition and action thereof will be briefly described below.

First, a photoconductive layer formed on a photoconductive drum 2 rotated is uniformly sensitized by a corona charger 3. Thereafter, a beam of laser light is projected onto the photoconductive drum 2 by an optical system 4 according to image data, so as to form an electrostatic latent image on the photoconductive drum 2, and then, the electrostatic latent image is developed with toners by a developing unit 5 so as to form a toner image thereon. On the other hand, there are set a number of cut papers on a paper feeding cassette 11, and after the cut papers are picked up one by one by a pick-up roller 12, the cut paper is sent to a transfer portion of the photoconductive drum 2 by the paper feeding rollers 13. The toner image formed on the photoconductive drum 2 is transferred onto a piece of cut paper by a transfer charger 6, and the transferred toner image is fixed thereon by a fixing unit 14. The cut paper for which the fixing process has been completed is discharged through a paper discharging path 15 onto a paper tray 17 by paper discharge rollers 16. The toners remaining on the photoconductive drum 2 is collected by a toner cleaner 8, and then, one printing process is completed.

Hereinbelow, the composition and action of the image reader 20 will be described.

A document set on the document tray 21 is detected by a document sensor 22, and the document is sent to a position of a paper sensor 25 one by one by a roller 23. Then, an image of the document (referred to as a document image hereinafter) is read by a contact type CCD linear image sensor 26 synchronously with rotation of the roller 24 by a motor (not shown) and a reading operation of the image sensor 26, and the document image is converted into digital image data. Thereafter, the converted digital image data are outputted to a buffer memory 59 shown in FIG. 2, and are converted into compressed image data by a compression and expansion section 60. Then, the compressed image data are stored in a compressed image memory 51. After reading the document image, the document is discharged onto a document discharging tray 28 by a paper discharging roller 27.

FIG. 2 shows a signal processing section of the facsimile apparatus shown in FIG. 1. As shown in FIG. 2, the facsimile apparatus further comprises: (a) a micro processing unit (referred to as an MPU hereinafter) 50 for controlling the whole operation of the facsimile apparatus; (b) an HDLC analyzer 52, a modulator and demodulator (referred to as a MODEM hereinafter) 53 and a network control unit (referred to as an NCU hereinafter) 54, each performing a signal processing of the facsimile and a communication process; (c) the compressed image memory 51, the buffer memory 59 and a page memory 61, each temporarily storing image data of the facsimile or the like; and (d) the compression and expansion section 60 and the image recovery processor 62 , each performing a predetermined process for processing an image signal. Respective sections 20, 51, 52, 53, 54, 59, 60 and 61 are connected through a bus 63 to the MPU 50. The operational panel 40 is directly connected to the MPU 50, and a printer controller 55 for controlling the laser printer 70 provided in the printer section 1 is connected to the MPU 50.

First, a receiving operation of the facsimile apparatus will be described below.

When there is caused an incoming call from the facsimile apparatus of the other party through the telephone line, an incoming call signal is inputted through the NCU 54 and the MODEM 53 to the MPU 50 and is detected, and then, a line connection process with the facsimile apparatus of the other party is performed according to a predetermined facsimile line connection procedure. After the line connection process, a compressed image signal transmitted from the facsimile apparatus of the other party is inputted through the NCU 54 to the MODEM 53, and is demodulated by the MODEM 53. Then, there is performed a predetermined HDLC inverse processing process for taking out only the compressed image data from HDLC frames of the demodulated image data by the HDLC analyzer 52, and then, the compressed image data are stored in the compressed image memory 51. After the compressed image signals of all the pages have been received, a line disconnection process with the facsimile apparatus of the other party is performed according to a predetermined facsimile line disconnection procedure.

The image data stored in the compressed image memory 51 are expanded by one page so as to be developed into practical image data on the page memory 61 by the compression and expansion section 60. The image data developed on the page memory 61 are inputted to the image recovery processor 62 , are converted into binary image data of high density by a process as described in detail later, and then the converted binary image data are outputted to the printer controller 55. A recording start signal is outputted from the MPU 50 to the printer controller 55 in synchronous with transfer operation of the image data to the printer controller 55, and then, the printer controller 55 transmits control signals and image data to the laser printer 70 so as to make the laser printer 70 print out the image data.

Next, the transmitting operation of the facsimile apparatus will be described below.

After all the above-mentioned image reading operations by the image reader 20 have been completed, a line connection process with the facsimile apparatus of the other party is performed. After the line connection process is completed, the compressed image data stored in the compressed image memory 51 are expanded so as to be developed on the page memory 61 by the compression and expansion section 60. Then, a compression process is performed again for the developed image data according to a performance of the facsimile apparatus of the other party, and then, the recompressed image data are stored in the compressed image memory 51. After a predetermined HDLC processing process is performed for the stored image data by the HDLC analyzer 52, a predetermined carrier signal is modulated by the MODEM 53 according to the image data after the HDLC processing process so as to generate a predetermined facsimile signal. Then, the facsimile signal modulated according to the image data is transmitted through the NCU 54 and the telephone line to the facsimile apparatus of the other party. After the transmission of the facsimile signal is completed, a line disconnection process with the facsimile apparatus of the other party is performed according to a predetermined line disconnection process, and then, the transmitting operation is completed.

The MPU 50 performs predetermined processes based on instructions inputted with the operational panel 40 by an operator, and outputs indication information to the operator and status information of the facsimile apparatus to the operational panel 40 and then displays them on the operational panel 40.

(3) IMAGE RECOVERY PROCESSOR

The image recovery section 62 comprises the half-tone data recovery section 101 for recovering multi-level half-tone data from the received bi-level image data. In the recovery process of the half-tone image, an image of multi-level can be reproduced by outputting multi-level half tone data recovered from pseudo-half-tone bi-level data when the multi-level image data of pseudo half-tone image are outputted to a multi-level printer for printing dot image of respective pixels with a multi-number of gradation stages.

Bi-level serial image data read from the page memory 61 is sent to a 9×9 matrix memory 100, which generates data of each pixel in a 9×9 window which locates a specified pixel to be recovered at the center and sends the data to the half-tone data recovery section 101 , to the image area judgement section 102 and to the smoothing section 103 . The 9×9 matrix memory 100 will be explained later in detail.

The half-tone data recovery section 101 comprises the edge emphasis component calculator 111, the smoothed value calculator 112, the edge judge section 113, and the recovery data calculator 114.

The edge emphasis component calculator 111 generates data of the maximum of the absolute values of the edge judgment amounts each amount representing an index for edge judgment based on inputted pixel data, outputs them to the edge judge section 113 and the recovery data calculator 114, generates data of edge emphasis amount used upon performing an edge emphasis process within a predetermined area, and outputs them to the recovery data calculator 114. Also, the edge judge section 113 generates an edge judgment signal based on the maximum value of the absolute values of the edge judgment amounts inputted, and outputs the edge judgment signal to the edge emphasis component calculator 111 and the smoothed value calculator 112. Further, the smoothed value calculator 112 calculates a smoothed value obtained by performing a smoothing process for pixel data within the predetermined area based on the inputted pixel data and the edge judgment signal, and outputs the smoothed value to the recovery data calculator 114. Furthermore, the recovery data calculator 114 recovers multi-level half-tone image data based on the edge emphasis amount and the smoothed value inputted, and outputs them to a selector 106. The half-tone data recovery section 101 will be explained later in detail.

The image area judgment section 102 comprises the adjacent state detection section 121 and the half-tone judge section 123.

Based on the inputted pixel data received from the 9×9 matrix memory 100, the adjacent state detection section 121 calculates adjacent judgment values for representing adjacent states of the same kind of pixels positioned within a predetermined area in four directions of the main scan and subscan directions and calculating adjacent judgment values for representing adjacent states of the same kind of pixels positioned within a predetermined area in the four oblique directions, and outputs them to the half-tone judge section 123. Further, the half-tone judge section 123 judges whether the predetermined area having the specified pixel in the center thereof is the half-tone area or the non-half-tone area based on the inputted adjacent judgment value, generates an image area judgment signal for representing the judgment result, and outputs the image area judgment signal to the selector 106. When it is judged that the predetermined area is a non-half-tone area, the image area judgment signal having a high level is outputted to the selector 106. On the other hand, when it is judged that the predetermined area is a half-tone area, the image area judgment signal having a low level is outputted to the selector 106.

The smoothing processor 103 performs a predetermined smoothing process, and then, outputs the processed bi-level image data to an input terminal A of the selector 106.

When the image area judgment signal has the high level or in the case of the non-half-tone area, the selector 106 selects the bi-level image data outputted from the processor 103 , and outputs the multi-level data simply in correspondence to black or white to the printer controller 55. On the other hand, when the image area judgment signal has the low level or in the case of the half-tone area, the selector 106 selects the bi-level image data outputted from the pseudo half-tone binarizing section 105, and outputs the recovered half-tone image data to the printer controller 55.

(4) 9×9 MATRIX MEMORY

Figure 4:
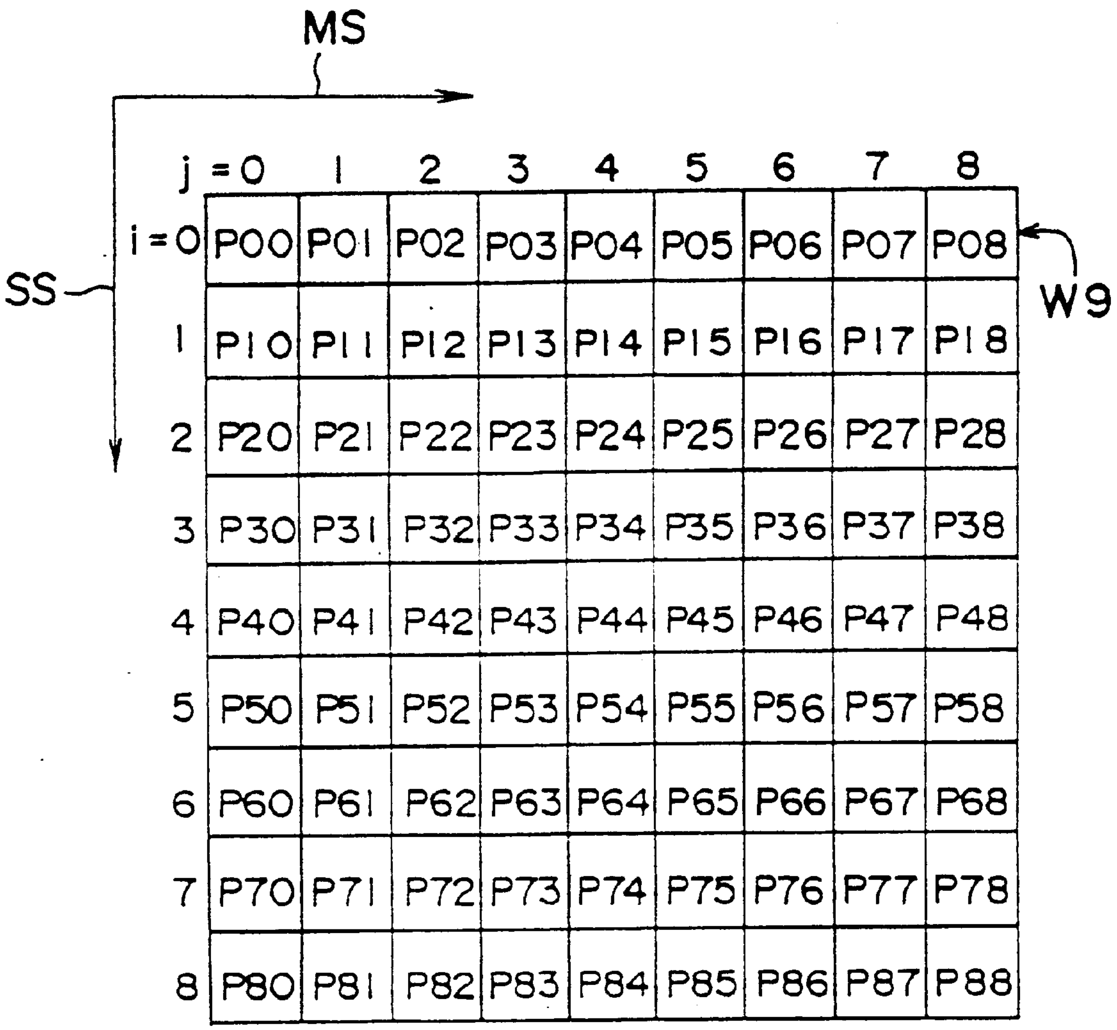
FIG. 4 is diagram of the arrangement of pixels in a 9×9 matrix.

As shown in FIG. 4, the 9×9 matrix memory 100 generates pixel data P00–P88 of the pixels located in each position in a matrix of a 9×9 window W9 having a specified data at the center thereof and sends the pixel data to the half-tone data recovery section 101 , the image area judge section 102 and the smoothing section 103 . In FIG. 4, an arrow MS denotes the main scan direction, and an arrow SS denotes the subscan direction. Further, i denotes a parameter for representing a position of the main scanning line within the window W9, and j denotes a parameter for representing a position of the subscan line thereof. The 9×9 matrix memory 100 is a memory wherein pixel data of the pixels up to four pixels from the specified pixel P44 in the main scan and subscan directions can be referenced to the specified pixel P44. That is, with the specified pixel P44 at the center of the window W9, the processing is performed with reference to pixels $P_{ij}$ (i=0, 1, . . . , 8; j=0, 1, . . . , 8) of 9×9 matrix, wherein each pixel $P_{ij}$ represents pixel data of 0 or 1 and i and j represent the positions in the main scan direction and in the subscan direction, respectively.

Figure 5:
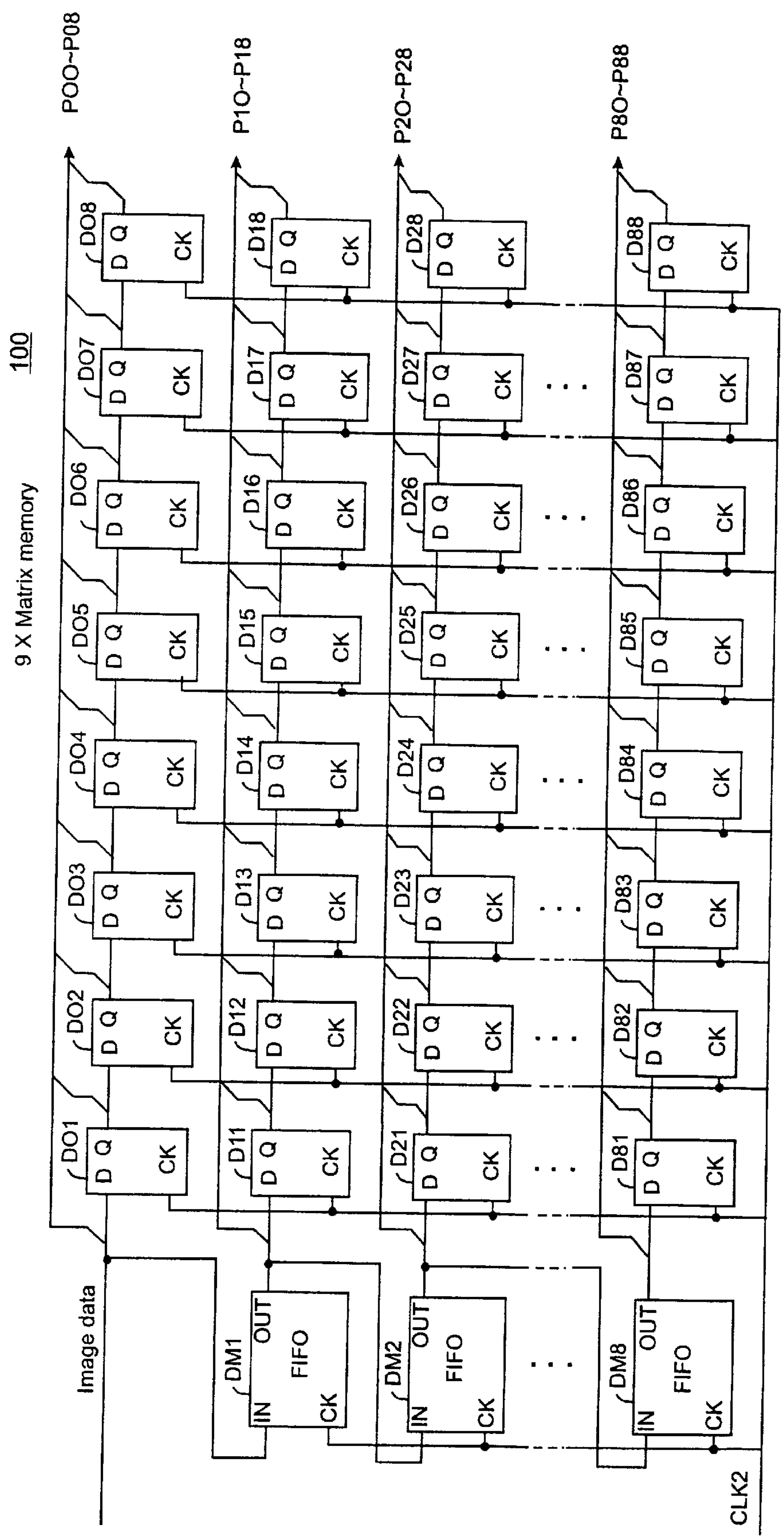
FIG. 5 is a schematic block diagram of a 9×9 matrix memory shown in FIGS. 3.

FIG. 5 shows the 9×9 matrix memory 100, which comprises: (a) eight FIFO memories DM1 to DM8 each delaying the inputted image data by one horizontal scanning interval which is one scanning time in the main scan direction, based on a clock CLK2 having the same period as that of a transfer clock of the binary image data inputted from the page memory 61 or having a period of one dot of the inputted binary image data; and (b) 72 delay type flip-flops D01 to D08, D11 to D18, D21 to D28, . . . , D81 to D88 each delaying image data inputted synchronously with the clock CLK2 by one period of the clock CLK2. Each of the FIFO memories and the D flip-flops store a pixel data, and 9×9 pixel data as shown in FIG. 4 are stored. The clock CK2 for the memory 100 has the same frequency ad the transfer clock of video image data before recovery.

After the bi-level image data outputted from the page memory 61 in serial in a direction from the last pixel of the image of each page to the first pixel thereof are inputted to the flip flop DOl, the inputted bi-level image data are outputted through the eight flip-flops D01 to D08 connected in series with each other. Also, after the bi-level image data outputted from the page memory 61 are inputted to the FIFO memory DM1, they are outputted through the eight FIFO memories DM1 to DM8 connected in series with each other. After the image data outputted from the FIFO memory DM1 are inputted to the flip-flop D11, they are outputted through the flip-flops D11 to D18 connected in series with each other. Further, after the image data outputted from the FIFO memory DM2 are inputted to the flip-flop D21, they are outputted through the flip-flops D21 to D28 connected in series with each other. Similarly, the image data outputted from the respective FIFO memories DM3 to DM8 are inputted to the flip-flops D31 to D81, respectively, they are outputted through the flip-flops D31 to D38, D41 to D48, . . . , and D81 to D88 respectively connected in series with each other.

In the 9×9 matrix memory 100 constituted as described above, the pixel data of one dot first inputted to the matrix memory 100 are outputted from the flip-flop D88, and the image data inputted at that time are outputted as pixel data P00. Further, respective pixel data P01 to P08 on the main scanning line of i=0 within the 9×9 window are outputted from the respective flip-flops D01 to D08, respectively, and respective pixel data P20 to P28 on the main scanning line of i=2 within the 9×9 window are outputted from the FIFO memory DX2 and the respective flip-flops D21 to D28, respectively. Similarly, respective pixel data P30 to P88 are outputted from the respective FIFO memories DM3 to DM8 and the respective flip-flops D31 to D88.

(5) HALF-TONE DATA RECOVERY SECTION (5-1) Windows for Edge Emphasis and for Smoothing In order to recover multi-level image data from bi-level image data of pseudo-half-tone image, the half-tone data recovery section 101 performs a smoothing process by adding pixel data in the periphery of the specified pixel to the pixel data of the specified pixel so as to calculate a smoothed value, and recovers multi-level image data based on the smoothed value.

In order to recover multi-level data from pseudo-half-tone bi-level image data, pixel data at the periphery of the specified pixel may be added to the data of the specified pixel.

Figure 6:
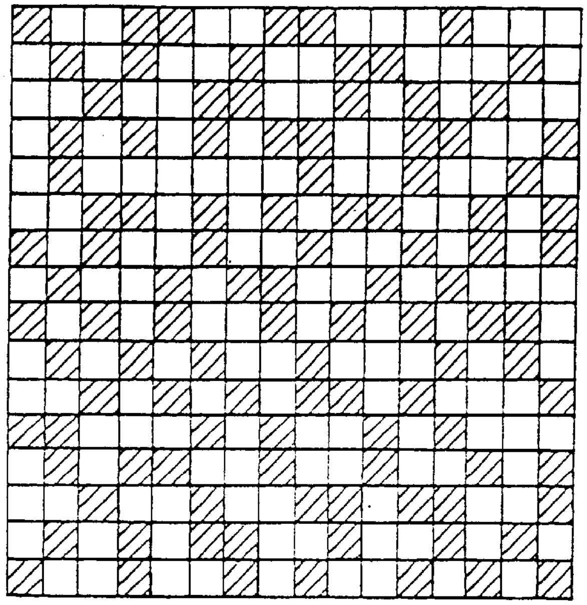
FIG. 6 is a diagram of an example of an image obtained when uniform image data having a ratio of 7/16 of a dimension of black pixels to a dimension of all the pixels are binarized using the error diffusion method.
Figure 7:
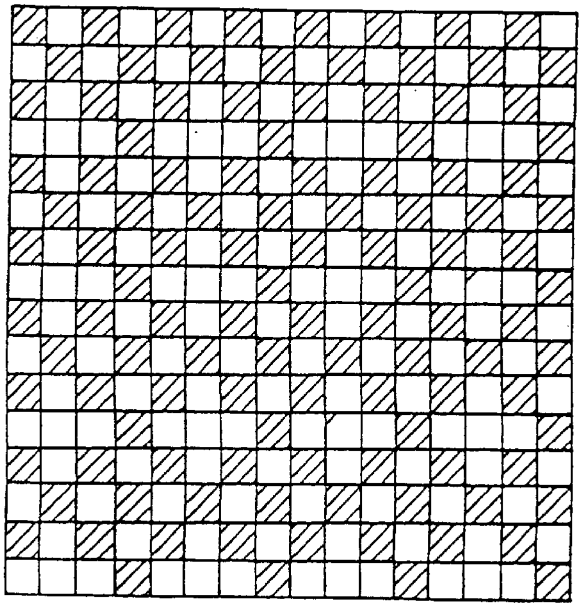
FIG. 7 is a front view showing one example of an image obtained when uniform image data having a ratio of 7/16 of a dimension of black pixels to a dimension of all the pixels are binarized using the dither method.

FIG. 6 shows an example of a bi-level image obtained when uniform image data having a ratio of 7/16 of black pixels to all the pixels are binarized by using the error diffusion method, and FIG. 7 shows an example of an image obtained when the uniform image data having a ratio of 7/16 are binarized by using the dither method. When, for example, a 2×2 window is used upon recovering multi-level image data of five gradation stages including, for example, zero white pixel and four black pixels from the bi-level image data of the pseudo half-tone image, the recovered multi-level image data has pixel data having various kinds of values in a range from zero to three in the case of the image shown in FIG. 6. On the other hand, the recovered multi-level image data has pixel data having various kinds of values in a range from one to three in the case of the image shown in FIG. 7. Therefore, there are the following two problems:

(1) When, for example, there are recovered multi-level image data of a natural number N of gradation stages, it is necessary to recover multi-level image data based on a number N or more of pixels. Therefore, in the case of using a square window, it is necessary to use a window having a size of $\sqrt{N}\times\sqrt{N}$ or a size larger than that size. Namely, in the case of N≦3, it is necessary to use a window having a size of a side equal to or larger than two dots.

(2) When the recovery process is performed not by using a window having a side equal to or larger than the interval of a period of the original bi-level image data of the pseudo half-tone image, the texture of the pseudo half-tone image may influence the recovered image. For example, in the case of the image shown in FIG. 7, since the image has a periodic property of four dots, it is necessary to use a window having a side of four dots or more. However, when the size of the window is increased, a shaded-off portion may arise in the recovered image.

Therefore, it is necessary to use a window satisfying the following conditions in the smoothing process upon the recovery process, and the following three conditions are hereinafter referred to as requirements of the size of the window:

(a) a window has a size equal to larger than the number of gradation stages of the image to be recovered;

(b) a window has a side larger than the interval of the period of the bi-level image data of the original pseudo half-tone image; and (c) a window has a side so that any shaded-off portion does not arise in the recovered image.

FIGS. 8–32 display spatial windows used for recovering bi-level image data to multi-level image.

(5-1-1) Window for Smoothing

In order to take into consideration the requirements of the size of the spatial filters (windows) used in the present invention, it is necessary that the window (a) includes a number of pixels larger than the number of gradation stages of the pseudo half-tone of the bi-level image data of the pseudo half-tone image; (b) that it includes a number of pixels larger than the number of gradation stages of the laser printer 70; and (c) that the size should not be large unnecessarily though any shaded-off portion has to be prevented in the recovered image.

Figure 8:
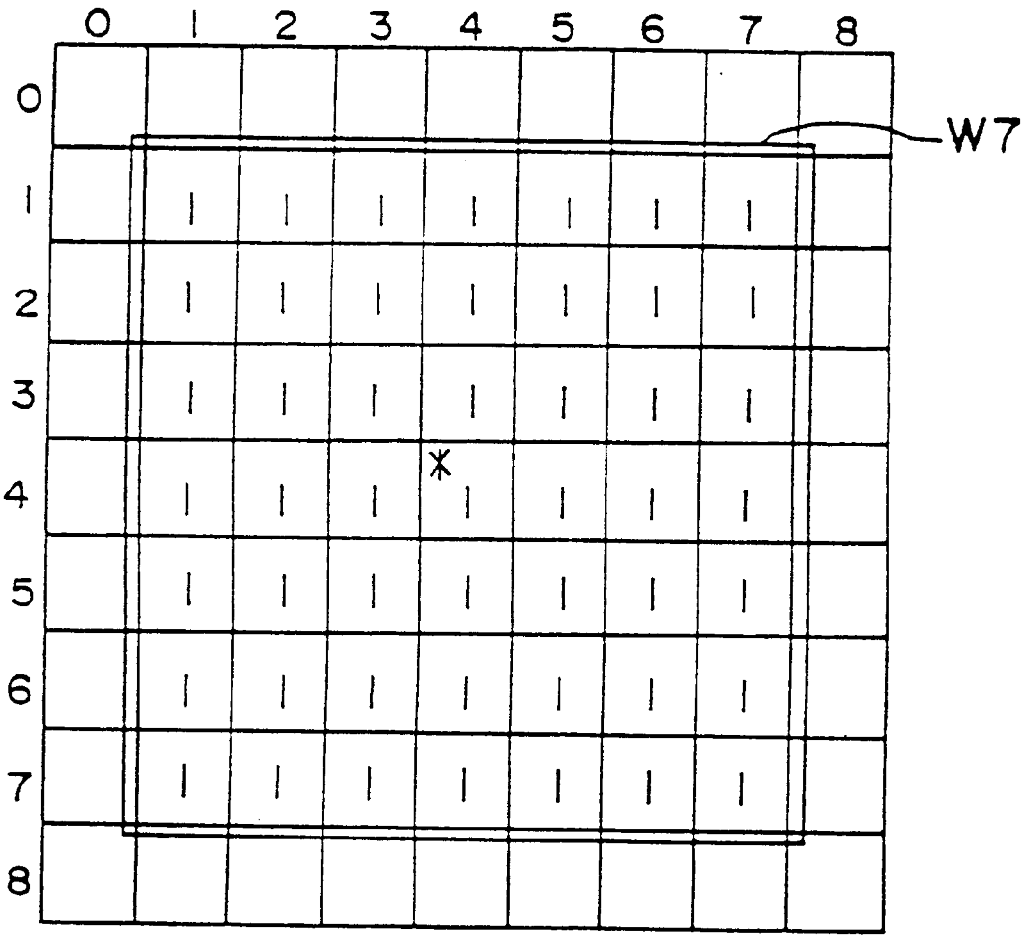
FIG. 8 is a diagram of a spatial filter having a 7×7 window.

Further, in the field of the facsimile apparatus to which the half-tone data recovery section 101 is applied, the number of the gradation stages of the pseudo half-tone bi-level image is preferably set to 16, 32 or 64. The bi-level image of the pseudo half-tone image having 64 gradation stages or more can be seen as almost the same image as that having 32 gradation stages by human eyes. Then, in the present invention, a spatial filter utilizing the 7×7 window W7 shown in FIG. 8 is used to recover the image data having 50 gradation stages, except for the edge area. The spacial filter shown in FIG. 8 is a filter which performs smoothing processing in a 7×7 window W7 with the specified pixel P44 at the center designated by a * mark. As will be explained later, the 7×7 black pixel counter 205 (refer FIG. 39) of the half-tone data recovery section 101 outputs the smoothing component by using the window W9.

It is to be noted that the reason why uniform weighting coefficients are used within the spatial filter is that the area gradation method is used as the pseudo half-tone binarizing method. Further, in the present preferred embodiment, there are used the square spatial filters. However, each of the spatial filters may have the other shape such as a regular hexagon or the like.

(5-1-2) Window for Edge Emphasis

Generally speaking, images include various kinds of spatial frequency components, originally. The object of the above-mentioned smoothing filter is to remove the spatial frequency components of the texture of the pseudo half-tone by performing the smoothing process. However, the higher frequency components other than the texture may decrease or disappear as a side reaction thereof. For example, the use of the 7×7 window W7 of FIG. 8 leads to attenuation of the high frequency components higher than the spatial frequency component of one period of 7×2 pixels. Therefore, in order to obtain a preferred recovered image, it is necessary to provide means for conserving the high frequency components. Previously, it has been suggested to make the window smaller for smoothing process for the image having the high frequency components, and it is used in the present preferred embodiment. In the present embodiment, there is used a method for conserving the high frequency components by the edge emphasis process, and the methods as well as the comparison methods and previous methods will be described below.

Multi-level image data for the specified pixel are calculated by using the 7×7 window W7, and there are calculated the four multi-level image data for four pixels adjacent to the specified pixel located in the center thereof in the four sides in the main scan and subscan directions. Thereafter, the edge emphasis amount is obtained based on the calculated multi-level image data. First, this method will be described below.

Figure 9:
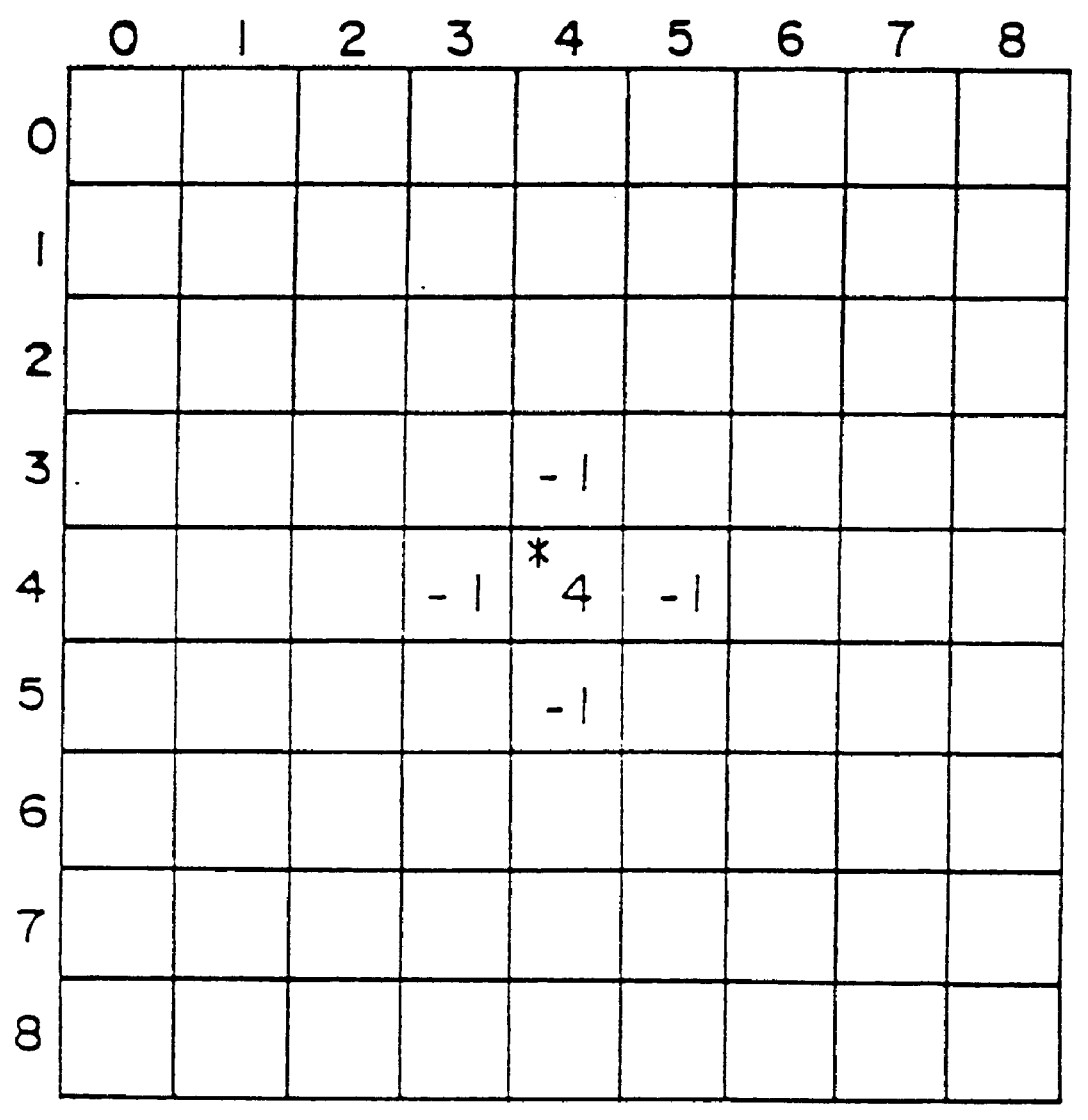

FIG. 9 shows a conventional Laplacian filter used upon performing the edge emphasis process for multi-level image data. In the calculation of the conventional Laplacian filter, as shown in FIG. 9, each of the image data of the four adjacent pixels P34, P43, P45 and P54 adjacent to the specified pixel P44 in the four sides in the main scan and subscan directions are subtracted from four times the pixel data of the specified pixel P44, and the difference thereof is set as the edge emphasis amount.

Figures 10, 11:
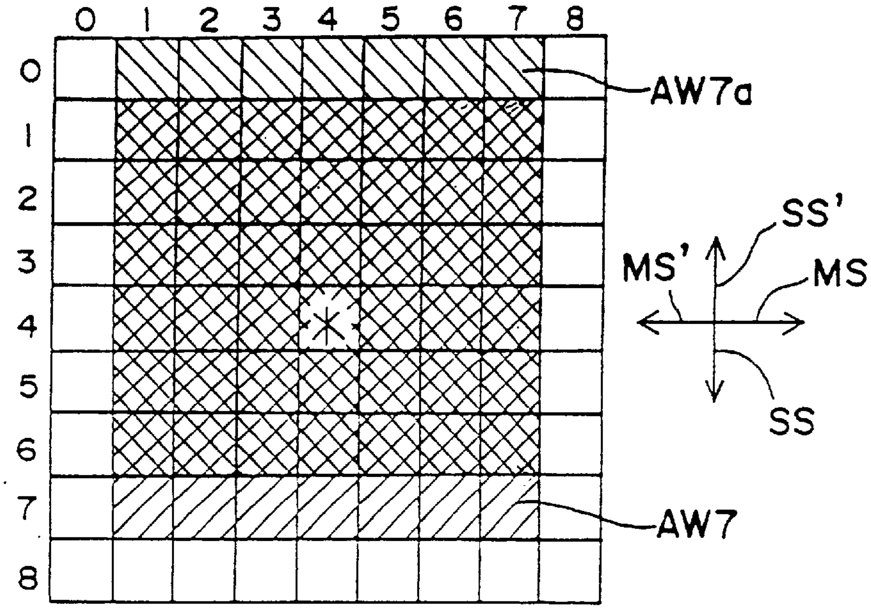
FIG. 10 is a diagram of an example of two 7×7 windows for edge emphasis.
FIG. 11 is a diagram of a spatial filter for edge emphasis.

The method for obtaining the edge emphasis amount is shown in FIG. 11. A smoothed value of a 7×7 window W7*a* obtained by shifting the window W7 by one dot in a direction SS' opposite to the subscan direction SS is subtracted from a smoothed value of the 7×7 window W7 of FIG. 10 having the specified pixel P44 in the center thereof. Similarly, after each of the smoothed values of the 7×7 windows obtained by shifting the window W7 by one dot in the subscan sides SS and in the two main scan sides MS and MS' is subtracted from the smoothed value of the 7×7 window W7, the obtained respective differences are added to each other, resulting in the edge emphasis amount. In FIGS. 10 and 11, the specified pixel P44 is denoted by *, and the specified pixel is also denoted by * in the other Figures.

However, as is clear from FIG. 11, there can not be calculated the values within the 5×5 window including the specified pixel P44 located in the center portion thereof, and the high frequency components within the image data are not included in the calculated value. Therefore, this means that the edge emphasis of the high frequency components of a finer image of seven dots or less can not be performed. Further, because the number of pixels to be processed is relatively small, an erroneous edge emphasis amount is liable to be outputted.

Figure 12:
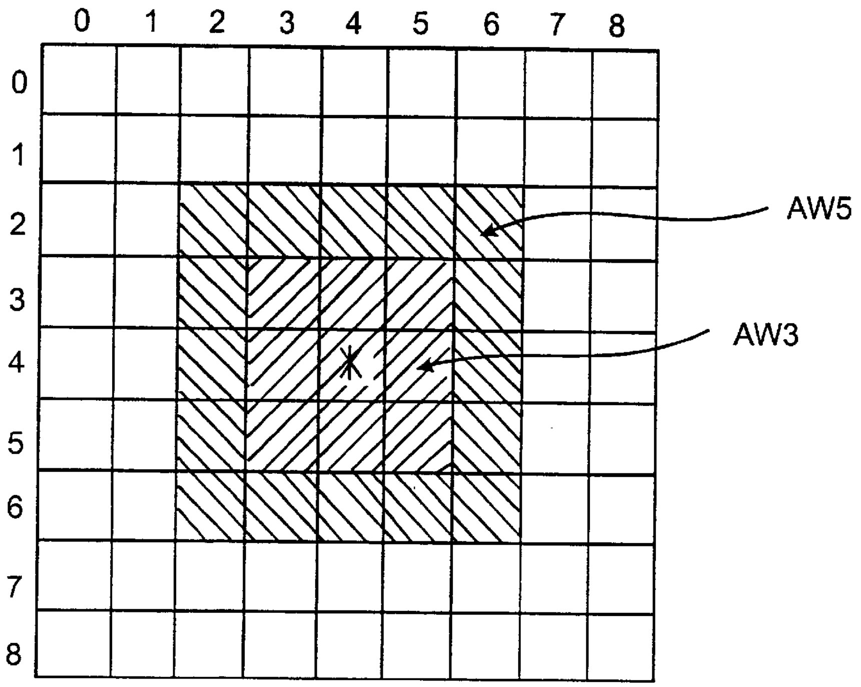
FIG. 12 is a diagram of two image areas used in the edge emphasis process shown in FIG. 13.
Figure 13:
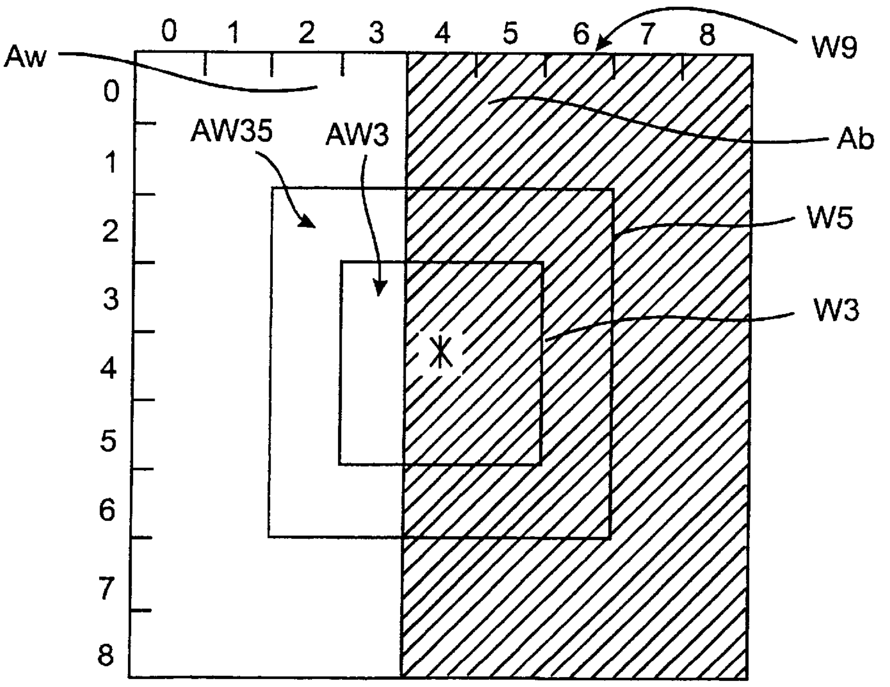
FIG. 13 is a diagram of one example of an image for which an edge emphasis process is to be performed and showing two image areas used in the edge emphasis process.

Next, as shown in FIGS. 12 and 13, a smoothed value of an area AW35 obtained by removing an area AW3 from the 5×5 window W5 having the specified pixel * in the center thereof is subtracted from a smoothed value of the area AW3 of the 3×3 window having the specified pixel *, and the obtained difference is set as the edge emphasis amount. This method will be described below. This method is different from the above-mentioned method in performing the edge emphasis of the high frequency components by using the pixel values in the periphery of the specified pixel to be calculated.

Now, as shown in FIG. 13, an image to be calculated is composed of an area Aw having all the white pixels in the left half thereof and another area Ab having all the black pixels in the right half thereof. When there is the specified pixel * on the boundary line between the white pixels and the black pixels, the number of the black pixels within the area AW3 is 6, and the number of black pixels within the area AW35 is 9. Therefore, the edge emphasis amount is represented by the following equation, by taking into consideration the ratio of the number of black pixels to that of white pixels:

$$6\times16/9-9=1.67. \quad (1)$$

However, since the maximum value of the edge emphasis amount in this direction is 16, it is considered that the edge emphasis amount obtained by the above-mentioned calculation is too small.

The problem of the method for the comparative example (FIGS. 12 and 13) is that the outputted edge emphasis amount is too small when the specified pixel is located in the center of the area to be calculated and there is an edge close to the specified pixel. This means that the edge emphasis amounts in all the directions can not be obtained from a difference between numbers of the black pixels in the two areas. Further, since the width of the window of the area AW3 is a length of three pixels, the edge emphasis process can be performed only for a narrow line composed of three pixels at the maximum.

Now, in order to obtain an edge emphasis amount in one direction, it is considered to arrange the specified pixel * on the boundary line between the two areas used upon calculating the edge emphasis amount. For an image composed of an area Aw of all the white pixels in the left half thereof and another area Ab of all the black pixels in the right half thereof as shown in (a) of FIG. 14, when a spatial filter is used to calculate the edge emphasis amount by using two windows (a region denoted by "1" and another region denoted by "−1") wherein the specified pixel is located on the boundary line between the areas Aw and Ab as shown in (b) of FIG. 14, the absolute value of the edge component amount becomes the maximum on the boundary line between the two areas Aw and Ab.

However, a sign of the edge component amount is not known in this method, the calculated value can not be used as the edge emphasis amount as it is. Then, it is considered that the sign of the edge can be defined correctly by locating the specified pixel at the center of one region of the two. Accordingly, in the present embodiment, the specified pixel is arranged in the center of the area of either one of the two areas used upon calculating the edge emphasis amount.

Further, following improvements are necessary.

(d1) An edge emphasis amount is calculated for each side

In order to obtain edge emphasis amounts in the vertical, horizontal and oblique directions, for example, eight (four pairs) windows as shown in FIGS. 15–22 become necessary. Then, a calculation circuit for calculating an edge emphasis amount and a calculation circuit for calculating an edge judgment amount are provided for each side from the specified pixel.

(d2) Edge emphasis amounts in two sides are obtained for each direction (for example, right and left as to the horizontal direction).

This is because, if spatial filters are limited to filters which obtain the difference of the numbers of black pixels of two regions, it is difficult to obtain edge emphasis amounts in a plurality of directions at the same time, as explained above. Therefore, edge components in a plurality of sides are obtained, and then the final edge emphasis amount has to be obtained. In the present invention, the largest value in the processing is selected. An edge component of a texture of pseudo-half-tone can be neglected as to the side for which edge emphasis is needed originally, while it cannot be neglected for the other side. If a simple sum of edge components of a plurality of sides is used, the edge component due to the texture is taken as an edge emphasis amount, and the value of the edge emphasis amount is liable to become a large value.

Further, a sum of edge components of a plurality of sides may also be taken as the final edge emphasis amount. Further, when each set consists of edge components of a plurality of edge components and a sum of edge components of a plurality of edge components is calculated for each set, the final edge emphasis amount may be taken as the largest among a sum of edge components.

In this embodiment, the processings of (d1) and (d2) are carried out by a first edge component calculator 202.

Further, the following improvement is necessary:

(d3) Edge emphasis amount is obtained for each spatial frequency to be emphasized.

There are various spatial frequencies at which edge emphasis has to be performed, and the size of window suitable for each spatial frequency exists. The size of the window is represented by a width of the window in a direction of the edge emphasis, as described in detail later. Originally, as the size of the window increases, the probability of emphasizing the texture of the pseudo-half-tone image decreases, and then, the high frequency components can not be emphasized. Therefore, in the present embodiment, there are provided a plurality of windows, and edge emphasis amounts of the spatial frequency components suitable for the respective windows are calculated to obtain the final edge emphasis amount from these edge emphasis amounts.

In the present embodiment, besides the windows of width of three pixels shown in FIGS. 15–22, secondary differential windows as shown in FIGS. 23–26 are used in order to emphasize an image of only one pixel of width. That is, these windows are used to emphasize an edge of higher spatial frequencies than the primary differential windows shown in FIGS. 15–22. The edge emphasis amount is obtained by doubling the number of black pixels at the positions denoted as "2" and by subtracting from it the number of black pixels at positions denoted as "−1". This calculation is performed by a second edge component calculator 203. It is to be noted that the primary differential windows shown in FIGS. 15–22 have almost the same spatial frequency characteristics as secondary differential filters of width of three pixels and of similar shapes to the secondary differential filters as shown in FIGS. 23–26. Such primary differential filters are used in order to make the effects of pseudo-half-tone textures as small as possible. Further, "width" of window means the width of two windows for subtraction in the direction of edge emphasis. For example, the width is three in the window of FIG. 23, while it is one in the windows of FIGS. 24 and 27.

Figure 27:
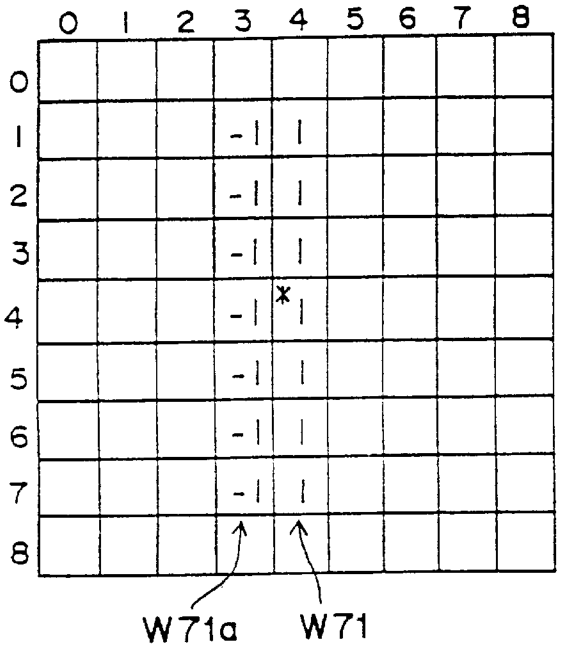
FIG. 27 is a diagram of an undesirable filter.
Figure 28:
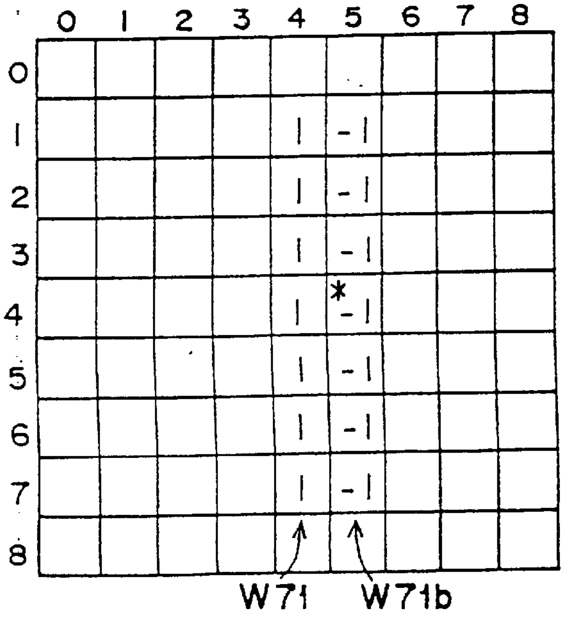
FIG. 28 is a diagram of an undesirable filter.
Figure 29:
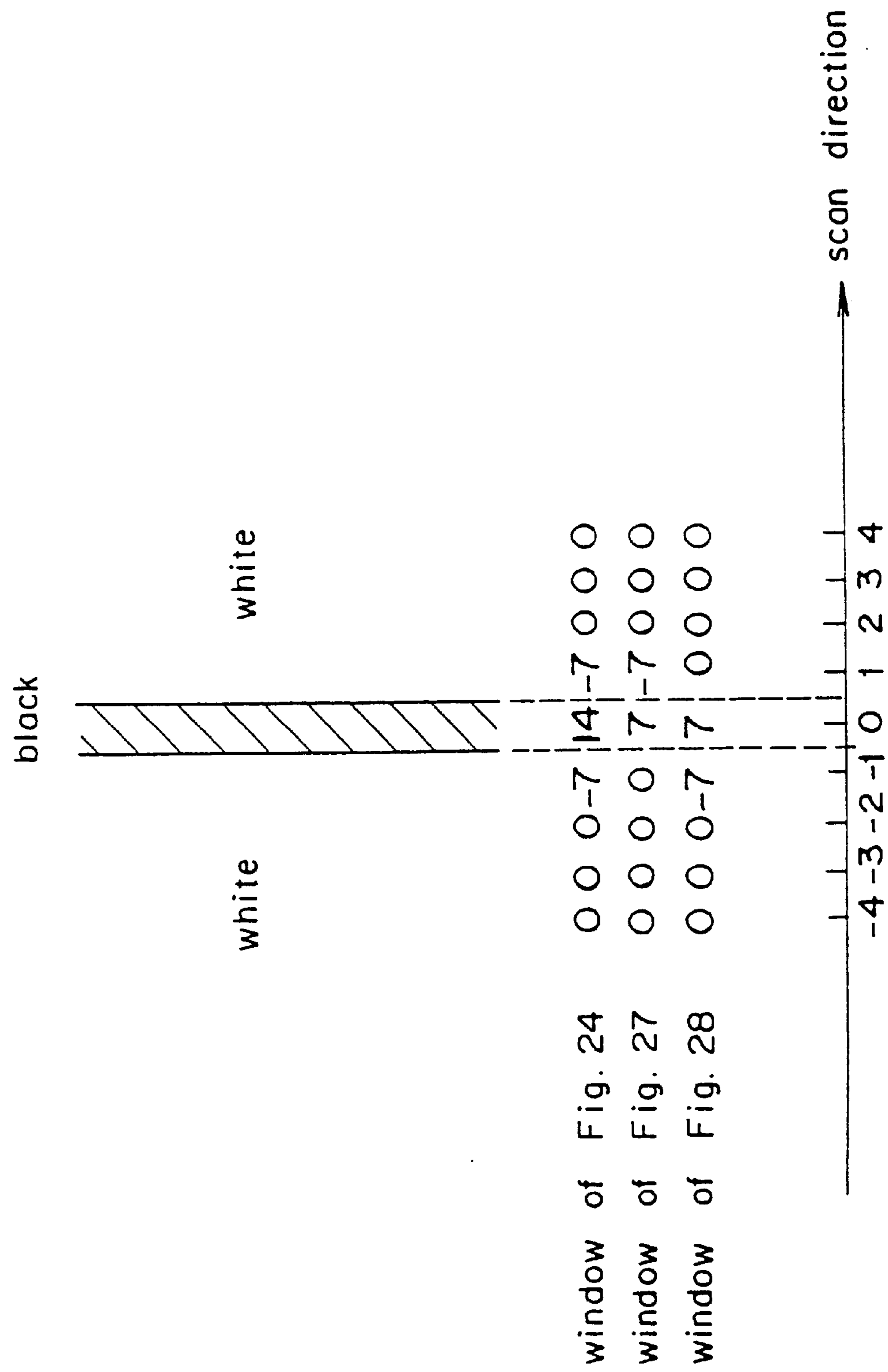
FIG. 29 is an image and smoothed value and edge emphasis amounts when processed by three spatial filters.

However, a combination of two primary differential windows of FIGS. 27 and 28 (to select the larger edge emphasis amount) is not good. If an image displayed at the upper portion of FIG. 29 is scanned by using the windows shown in FIGS. 24, 27 and 28 to obtain edge components, the resultant edge emphasis amounts are shown in the lower portion of FIG. 29. If the windows shown in FIGS. 27 and 28 are combined, the edge emphasis amount becomes 7 at zero in the main scan direction, while it becomes −7 at the positions before and after the zero, so that the total density cannot be conserved. On the contrary, when the window shown in FIG. 24 is used, the edge emphasis amount becomes 14 at zero in the main scan direction, while it becomes −7 at the positions before and after the zero, so that the total density can be conserved. This is the reason to use the secondary differential windows shown in FIGS. 23–26. As explained above, the secondary differential filter shown in FIG. 24 is superior on the conservation of density. However, it is also liable to be affected by pseudo-half-tone textures.

To sum up, the windows of width of three pixels is used to think seriously the removal of the effects of pseudo-half-tone textures included in the edge amount in unnecessary directions, while the windows of one pixel of width are used to think seriously the conservation of density. This is because the windows of one pixel of width take an image without pseudo-half-tone textures as an object originally.

(d4) A final edge emphasis amount is obtained from these edge emphasis amounts.

The following two conditions become necessary in order to recover an image correctly.

(d5) The output range of a window for smoothing is almost the same as that referred by a window for edge emphasis. If the range of edge emphasis is narrower, unnecessary smoothing components remain outside the edge emphasis range. On the other hand, if the range of edge emphasis is wider, the conservation of edge components lost by the smoothing processing is performed effectively, though a simple edge emphasis can be performed effectively. Thus, if a window for smoothing has a width of N1 pixels and a window for edge emphasis has a width of N2 pixels, it is set that $N1 \geqq N2$.

(d6) Windows for edge emphasis for a plurality of frequency band widths have images of frequency band width suitable for edge emphasis, respectively. The edge emphasis amount of a window for edge emphasis has to be larger in the frequency band width than the edge emphasis amounts of other windows of different widths. That is, the edge emphasis amount obtained by a window of width of N pixels has to be the largest for an image of a period of (2×N) pixels than any window of a different width.

Figure 17:
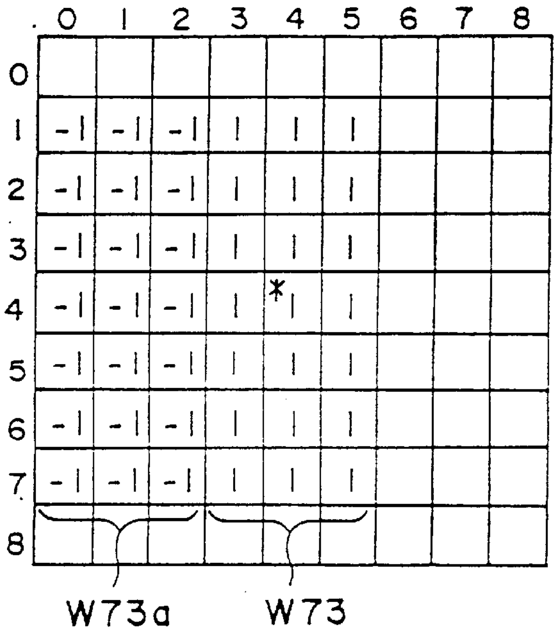
FIG. 17 is a diagram of a third spatial filter used for calculating edge emphasis amount.
Figure 18:
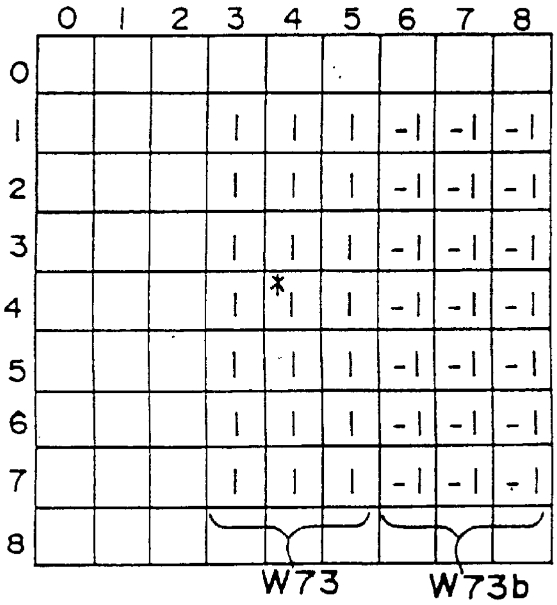
FIG. 18 is a diagram of a fourth spatial filter used for calculating edge emphasis amount.
Figure 30:
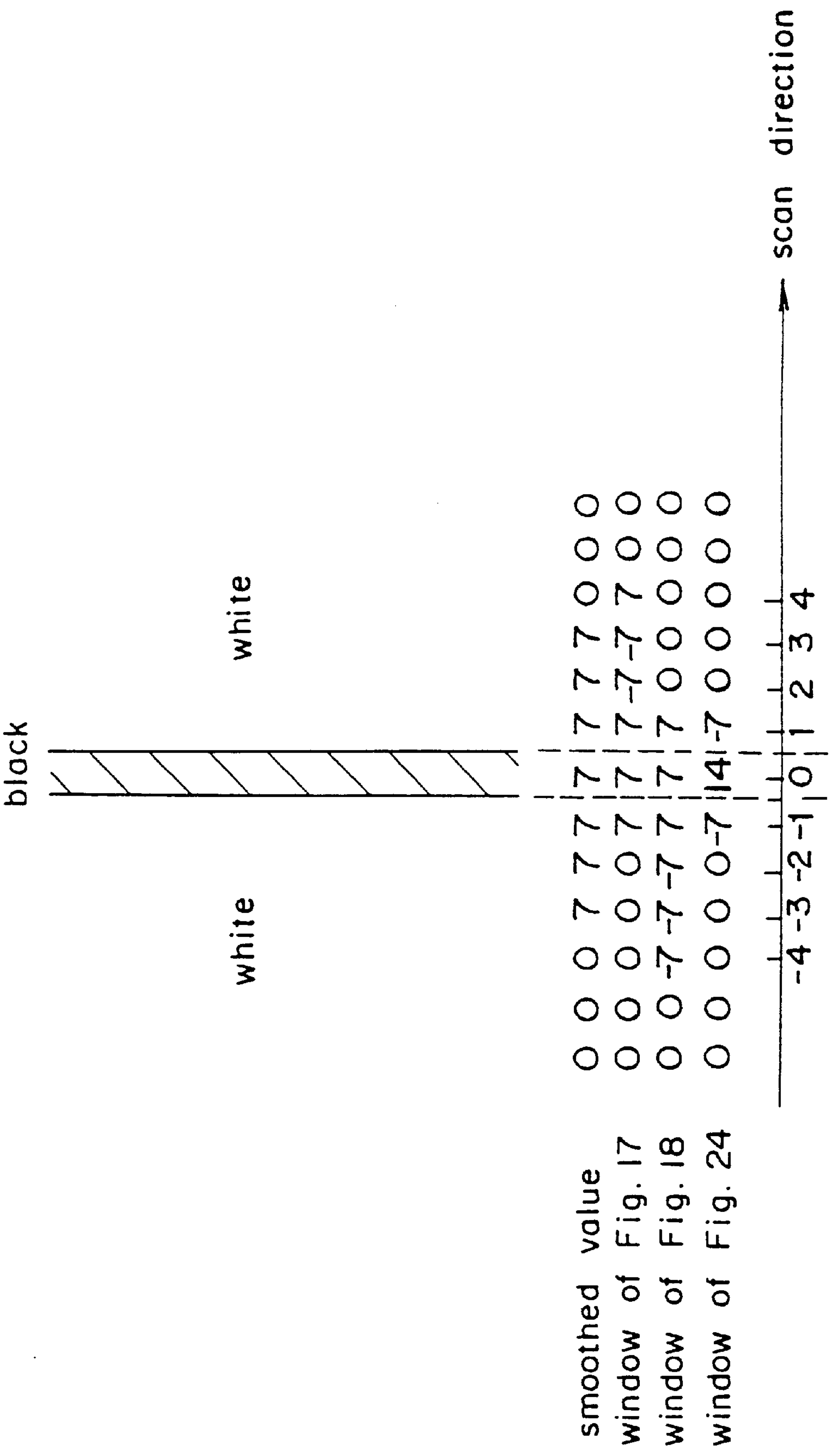
FIG. 30 is an image and smoothed value and edge emphasis amounts when processed by three spatial filters.

FIG. 30 displays a smoothed value smoothed by a 7×7 window and edge emphasis amounts of an image of a narrow line shown at the upper portion processed by the windows of FIGS. 17, 18 and 24. FIG. 30 is explained as to the above-mentioned (d5). The smoothed value is outputted in a range between −3 and 3 in the scan direction, while edge emphasis components are outputted in a range of −4 and 4. If the range of edge emphasis is narrower, unnecessary smoothing components remain outside the edge emphasis range. On the other hand, if the range of edge emphasis is wider, edge emphasis is performed even in an unnecessary range. In this embodiment, the range for edge emphasis is wider by one pixel than the range for smoothing. Then, a means for judging whether edge emphasis is selected or not is provided. Further, in the range for edge emphasis, edge emphasis component is taken seriously, so that the above-mentioned difference of width can be taken as allowable.

FIG. 30 is also explained as to the above-mentioned (d6). In a range of −1 and 1 in the scan direction in FIG. 30, it is necessary to convert the output value of the window of width of one pixel of FIG. 24 so that the absolute value thereof becomes larger than the absolute value of the output value of the windows of width of three pixels of FIGS. 17 and 18. A simple comparison may select an edge emphasis amount of a larger window due to the difference of area ratio of windows. Then, in this embodiment, a multiplier 207 is used to multiply the output of the second edge component calculator 203 by a constant K1. The constant K1 has to be larger than one. It is also to be considered that the constant K1 has to be smaller than three of the simple area ratio because errors increase with increasing window size. An edge emphasis amount obtained by a window of width of N pixels in the edge emphasis direction can detect an image of lower frequencies than an image of a period of (2×N) pixels. Then, it is considered sufficient that an edge emphasis amount of an image of a period of (2×N) pixels can be obtained by a window of width of N pixels. The above-mentioned (d6) satisfies this condition.

(5-1-3) Window for Edge Region Detection

Windows which has a specified pixel to be processed at the center thereof are not appropriate for the judgement whether the region to be processed is a region for edge emphasis (edge region) or not. It is said that the size of a window for edge region detection has a size so as to include patterns specific to pseudo-half-tone image. Thus, if the specified pixel is located at the center of a window and two windows of the same size are provided at both sides in the edge detection direction, the memory capacity used for the processing becomes large.

Figure 14:
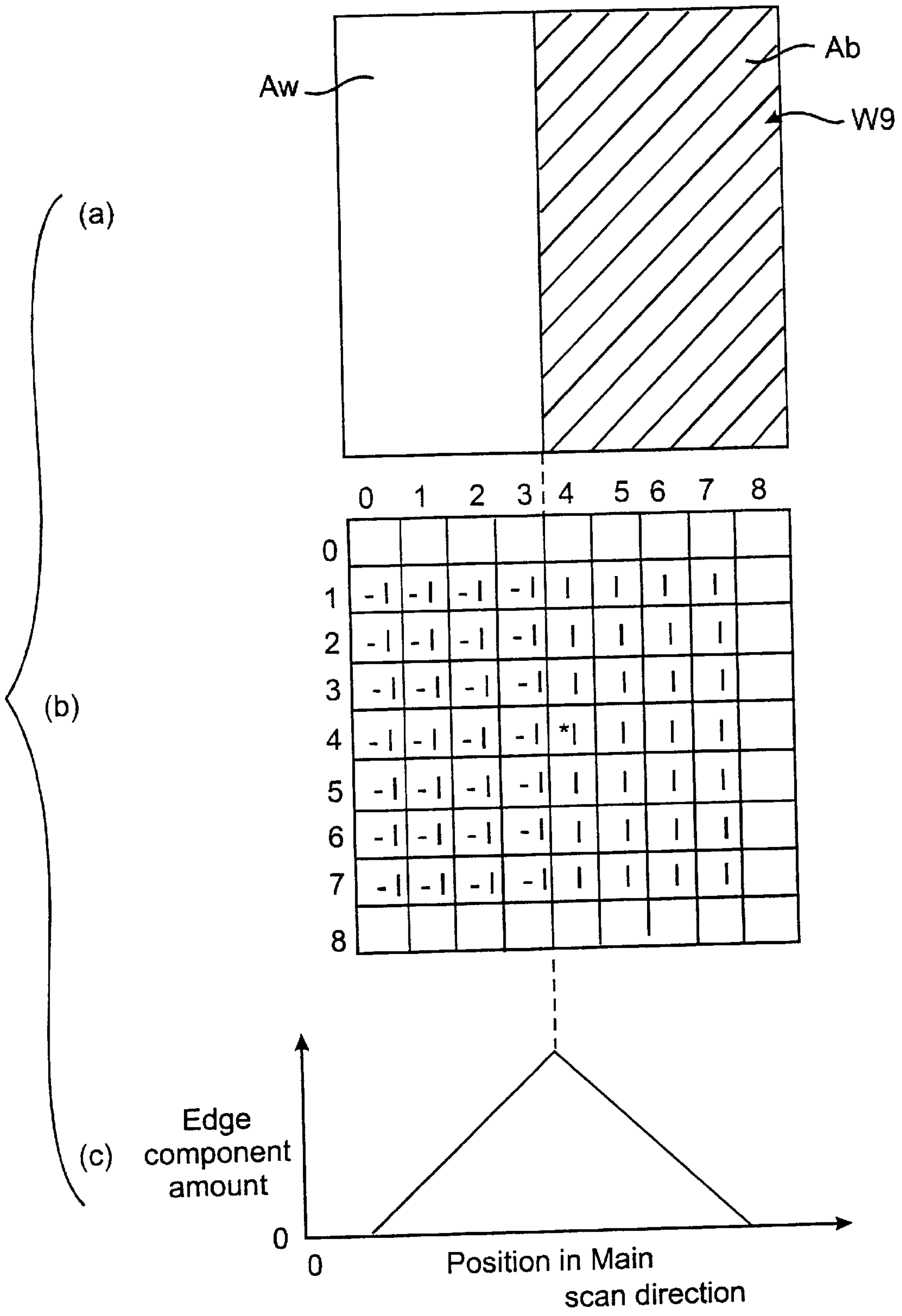
FIG. 14 is a diagram of an image, a filter for edge emphasis and edge component.

Then, a window as shown at (b) in FIG. 14 is used for edge region detection because edge region detection needs only the magnitude of edge quantities. Further, as in case of edge emphasis amount, windows are needed for a plurality of directions and for a plurality of frequency band widths, and a means for obtaining the final edge emphasis amount from a plurality of edge emphasis amounts is needed.

Six (or three pairs) windows shown in FIGS. 31–36 are windows for edge region detection used in the present invention. These windows detect whether an edge exists or not in a vertical direction, in the horizontal direction, in a oblique direction, in the other oblique direction, in the vertical direction and in the horizontal direction, respectively. Further, the windows of FIGS. 35 and 36 detects an edge of higher frequency than the other four windows. In the detection of an edge of higher frequency, windows for oblique directions are not provided because they are liable to detect patterns in oblique directions due to the dispersion type dither method or to the error dispersion method.

Figure 31:
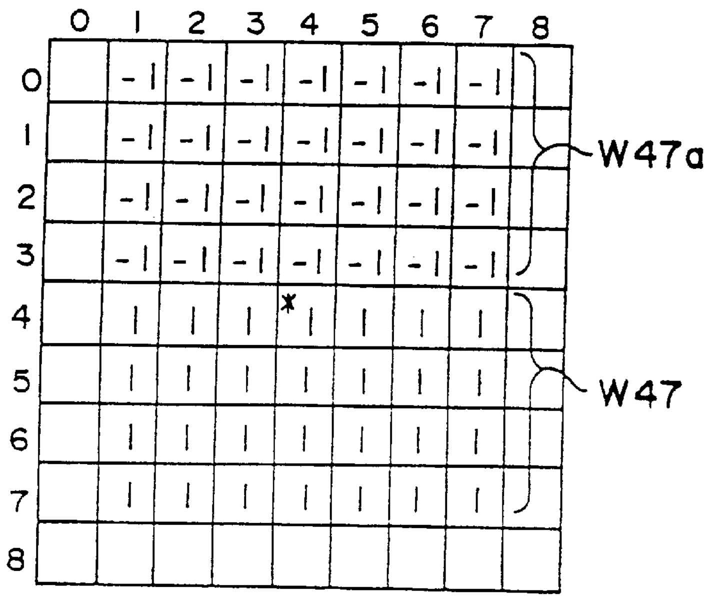
FIG. 31 is a diagram of a twenty first spatial filter used for edge region judgement.
Figure 32:
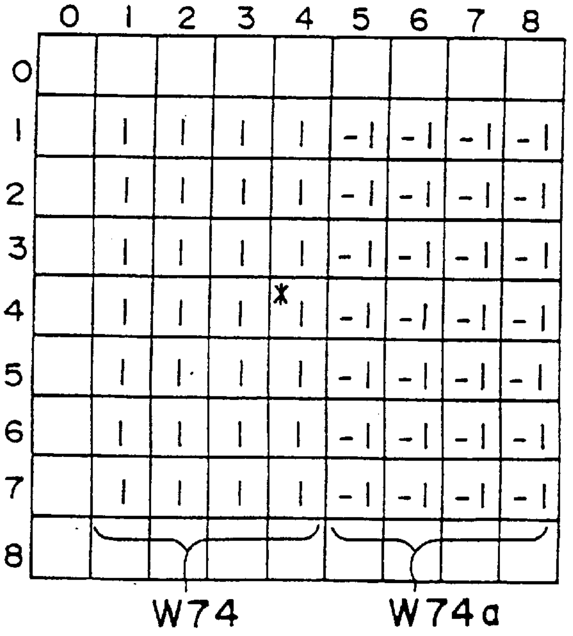
FIG. 32 is a diagram of a twenty second spatial filter used for edge region judgement.
Figure 35:
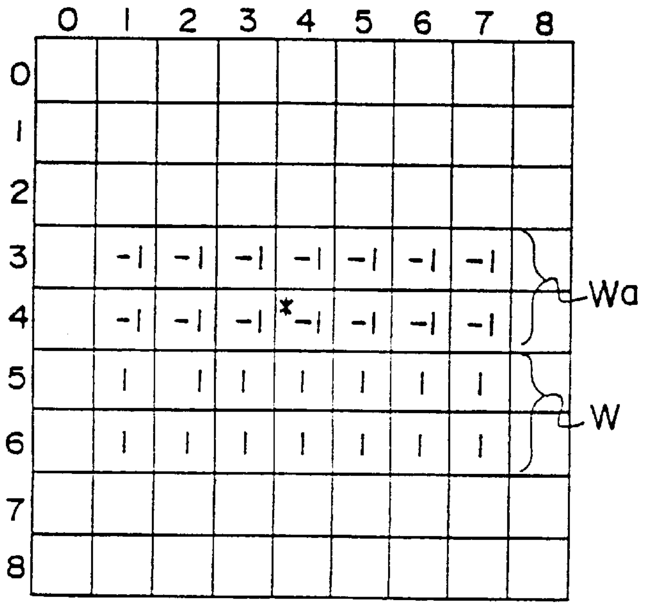
FIG. 35 is a diagram of an twenty fifth spatial filter used for edge region judgement.
Figure 36:
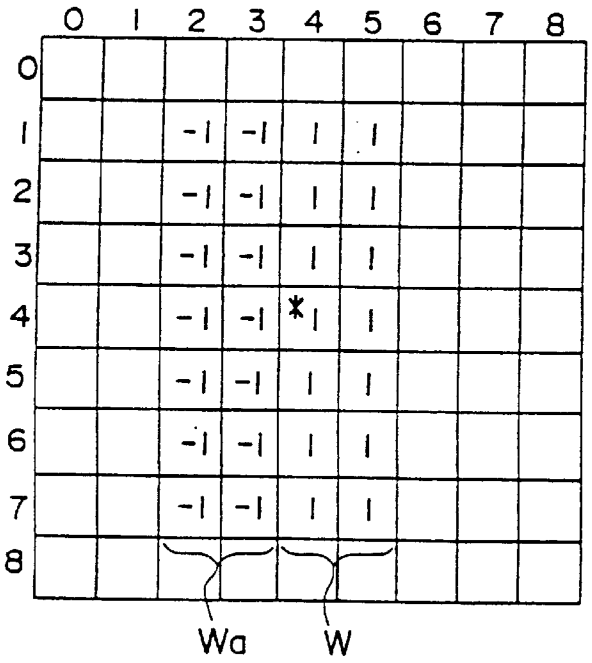
FIG. 36 is a diagram of a twenty sixth spatial filter used for edge region judgement.
Figure 37:
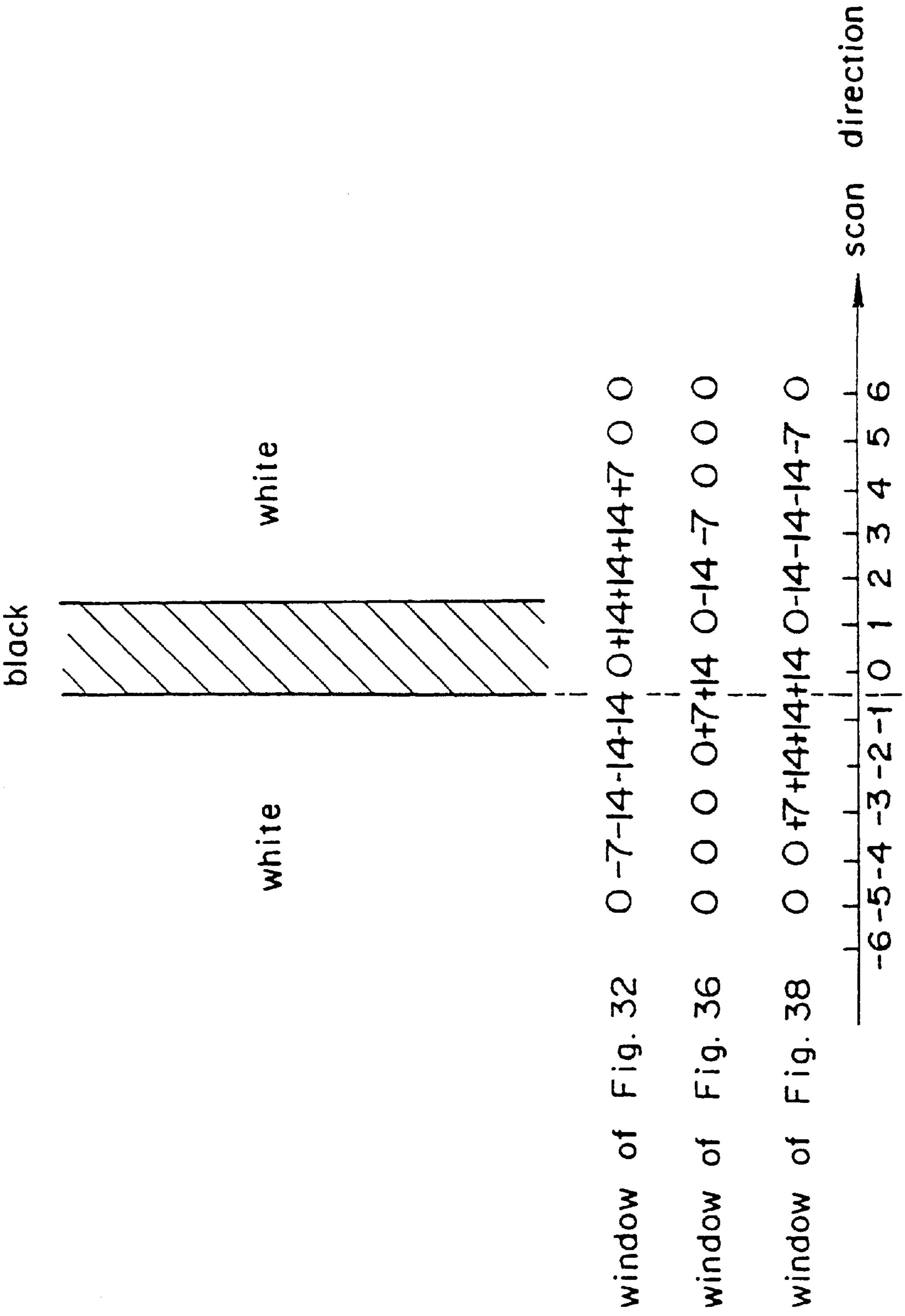
FIG. 37 is a diagram of an image, a filter for edge emphasis and edge component.

The specified pixel to be processed is located in the left window in FIG. 32 and in the right window in FIG. 36. This reason is as follows: If the specified pixel is located at the boundary of the two windows for a window for edge detection, there is a point at which the detection becomes impossible for an image wherein black and white are changed at a high frequency or at a period shorter than the width of the window in the scan direction. For example, for an image of a narrow line of width of two pixels shown at the upper portion of FIG. 37, edge emphasis amounts obtained by scanning the windows shown in FIGS. 32, 36 and 38 in the direction of the arrow are shown at the lower portion of FIG. 37. It is found that there is a point at which the edge emphasis amount cannot be detected. Then, two pairs of windows for detecting an edge in a direction are provided, and each pair consists of windows for detecting an edge in a direction. The specified pixel is located in a window of a pair at a side adjacent to the other window. Further, if the specified pixel exists in a window of a first pair, the specified pixel is located in the second pair in the window of a different side from the above-mentioned window of the first pair. That is, two pairs of windows are used wherein the position of the specified pixel is different from each other. In this embodiment, the above-mentioned processing is performed for a combination of windows which can detect an edge component in the direction but have a different size from each other (FIG. 31 and FIG. 35, FIG. 32 and FIG. 36). For example, the specified pixel is located in the lower window in a pair of windows shown in FIG. 31, while it is located in the upper window in a pair of windows shown in FIG. 35. Further, as explained before, in the other pair, the specified pixel is included in the left window in FIG. 32, while it is included in the right window in FIG. 36. Further, a pair consists of windows of different sizes in this embodiment such as windows of FIG. 31 and of FIG. 35 in order to prevent erroneous detection at different spatial frequencies.

(5-2) Structure of Half-tone Data Recovery Section

Figure 39:
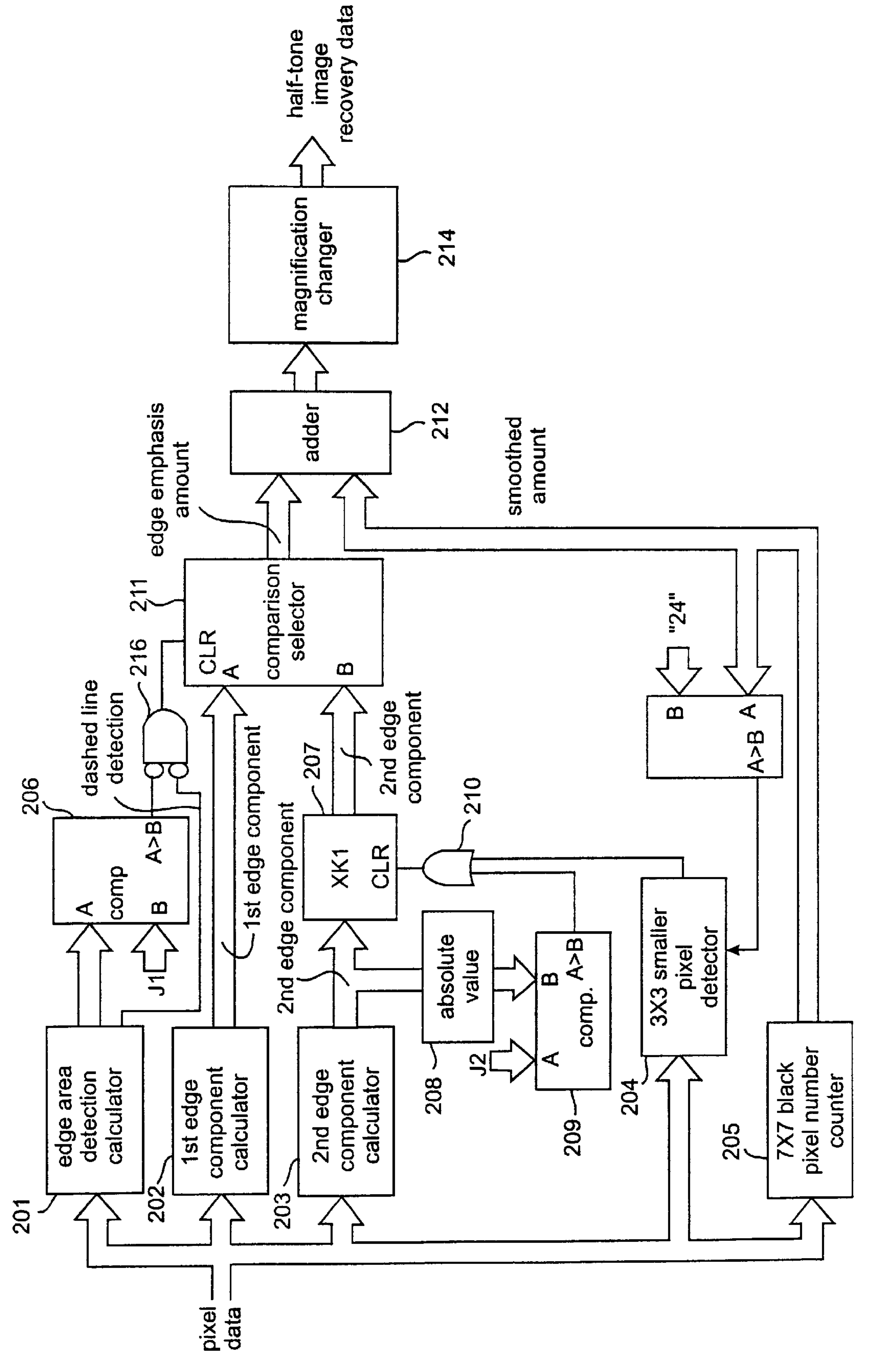
FIG. 39 is a block diagram of half-tone data recovery section.

Next, the structure and action of each portion of the half-tone data recovery section 101 shown in FIG. 39 are explained. In the drawings explained below, the number of each data represent bit-number and "7(S1)" means 7-bit data including one sign bit.

In order to detect an edge region, an edge region detection calculator 201 detects an edge region detection component which is the largest among the values obtained with the windows shown in FIGS. 31–36 and sends it to a comparator 206.

In the comparator 206, if the edge region detection component is smaller than J1, the edge emphasis amount as an output of a comparison selector 211 is cleared so as not to conduct edge emphasis processing because the image under processing is taken as an image of uniform density.

However, the edge region detection calculator 201 also detects a dashed line, and if a dashed line is detected, the clear signal is stopped by a logic gate 216.

Here, the necessity of the detection of dashed line is explained.

Figure 40:
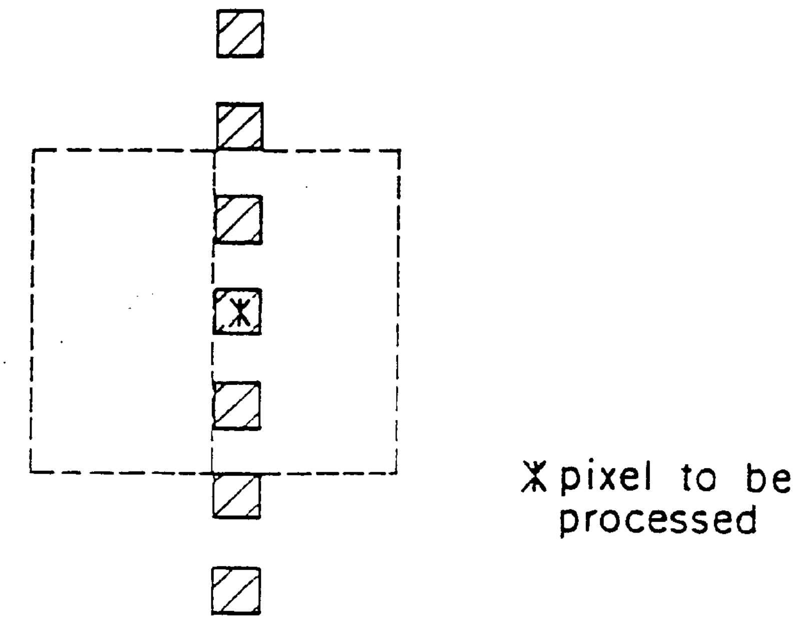
FIG. 40 is a diagram for explaining the relation of a dashed line image with a window.

When an image data of narrow line or of a straight line of low density is binarized with a pseudo-half-tone image processing, the resultant image becomes a dashed-line-like image as shown in FIG. 40.

For example, if an edge emphasis amount of a dashed line image as shown in FIG. 40 is detected with an window (displayed as a dashed line) shown in FIG. 32, the image including the dashed line is liable to be judged as a non-edge region because the number of black pixels consisting the dashed line is small. If the image is judged as a non-edge region, the image cannot be recovered as a sharp image.

Then, when an edge region detection amount does not exceed a threshold value J1, if the edge region detection amount exceeds another threshold value J3 smaller than J1 and the number of black pixels of one window is zero, it is judged that a dashed line exist and the image is processed as an edge region.

Though this embodiment processes only black dashed lines in white background, white dashed lines in black background may also be processed similarly.

The first edge component calculator 202 detects the largest edge component by using the windows shown in FIGS. 15–22, while the second edge component calculator 203 detects the largest edge component by using the windows shown in FIGS. 23–28. It is to be noted that the "largest" means that the absolute value is the largest. The first and second edge components of different spatial frequencies are compared by the comparison comparator 211, which sends the larger value as a final edge emphasis amount.

However, the second edge component is taken as zero in the following conditions:

(e1) The magnitude of the second edge component is smaller than a threshold value J2.

(e2) There is no minority pixel in a 3×3 window including the pixel under processing at the center.

In the detection of second edge component, edge judgement is liable to err because the windows to be used are small and special patterns of pseudo-half-tone image are judged as edges. Then, the condition (e1) corrects errors by making the magnitude zero as an error if the magnitude is smaller than the threshold value J2. The condition (e2) means edge emphasis is nonsense in this condition because the window has a width of one pixel in the direction for emphasis.

Figure 41:
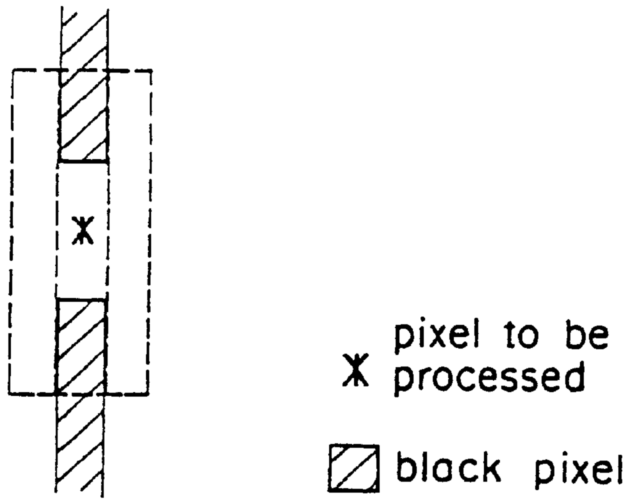
FIG. 41 is a diagram which shows the relation between an image and a window.

When the window shown in FIG. 24 is located for an image displayed in FIG. 41, edge is emphasized in the right and left sides without the restriction of the condition (e1), and the edge emphasis amount is "+" (black). The image shown in FIG. 41 has to be emphasized in the up and down directions by using the windows shown in FIGS. 15 and 16 and the edge emphasis amount should be "−" (white). Then, the restriction of the condition (e2) is used to make the edge emphasis amount by the window shown in FIG. 25 zero.

In the half-tone data recovery section 101 shown in FIG. 39, the comparator 209 compares the absolute value of the second edge component generated by the absolute value circuit 208 with the threshold value J2, and if J2 is larger, the output signal of the comparator 209 is sent via an OR gate 210 to a multiplier 207 so as to clear the output of the multiplier 207.

The 3×3 minority pixel detector 204 detects whether minority pixels exist in a 3×3 window with the pixel under processing of the condition (e2) at the center, and if there is no minority pixel, the output signal of the detector 204 is sent via an OR gate 210 to the multiplier 207 so as to clear the output of the multiplier 207.

In this embodiment, the conditions (e-1) and (e-2) are checked only on the second edge component. However, the conditions (e-1) and (e-2) may also be checked on the first edge component. In this case, the value of J2 in the condition (e1) and the size of the window in the condition (e2) have to be changed appropriately.

If the two conditions (e1) and (e2) are not satisfied, the second edge component is multiplied with the constant K1 (a scaling constant for edge emphasis amount) and the multiplied value is sent to the comparator 211.

Further, the edge region detection calculator 201 also detects a dashed line at the same time. That is, the edge region detection calculator 201 receives a signal which means that the pixels in the window are all white and detects a dashed line by using the conditions that either of a set of windows are all white and that the edge amount is larger than J3.

As will be explained later, if a dashed line is detected, the edge emphasis amount is not outputted.

The second edge component sent by the second edge component calculator 203 is multiplied with a prescribed scaling factor and two kinds of filter control are performed.

The 7×7 black pixel number counter 205 counts the number of black pixels in a 7×7 smoothing filter with the pixel under processing at the center to get a smoothing component which is sent to an adder 212. Further, the value is compared with "24" by a comparator 213 to judge either of white and black is minority pixel and the judgement is sent to the 3×3 minority pixel detector 204.

Further, the size of the smoothing window may be changed according as the region is an edge region or not.

Finally, in the adder 212, the edge emphasis amount received from the window for edge emphasis and the smoothing amount received from the window for smoothing are mixed or added and the results are rounded in the magnification change circuit 214 to a desired gradation number. Thus, multi-level data of pseudo-half-tone image is recovered to a bi-level data.

(5-3) Structure of Each Portion of Half-tone Data Recovery Section

The structure of each portion of the half-tone data recovery section 101 is explained below. In the half-tone data recovery section 101 , an edge region detection calculator 201 (FIGS. 42 and 43), a first edge component calculator 202 (FIGS. 44 and 45) and a second edge component calculator 203 (FIG. 46) make use of logic B circuits (FIG. 47), logic C circuits (FIG. 48), logic D circuits (FIG. 49) and logic E circuits (FIG. 50), and a edge component is obtained by calculating the number of black pixels in one of the windows and by using a subtracter.

The twenty first spatial filter shown in FIG. 31 and the twenty second spatial filter shown in FIG. 32 are provided for detecting edge components in the subscan and main scan directions, respectively. The twenty first spatial filter is provided for performing a filtering process by subtracting a smoothed value of a 4×7 window **W47*a* having the center thereof located in the center of the boundary between the pixels P14 and P24 from a smoothed value of the 4×7 window W47 having the center thereof located in the center of the boundary between the pixels P54 and P64, while the twenty second spatial filter is provided for performing a filtering process by subtracting a smoothed value of a 7×4 window W74***a* having the center thereof located in the center of the boundary between the pixels P46 and P47 from a smoothed value of the 7×4 window W74 having the center thereof located in the center of the boundary between the pixels P42 and P43. That is, the logic D circuits LD1 and LD2 calculate the numbers of black pixels in the window W47*a* and in the window W47, and a subtracter calculates the difference between the two windows W47 and W47*a*. Similar processings are performed as to the other spatial filters shown in FIGS. 32–34. If the maximum of the largest of the obtained edge amounts is smaller than the threshold value J1 by the comparator 206, the edge emphasis amount is not outputted.

(5-3-1) Edge Region Detection Calculator

Figure 42:
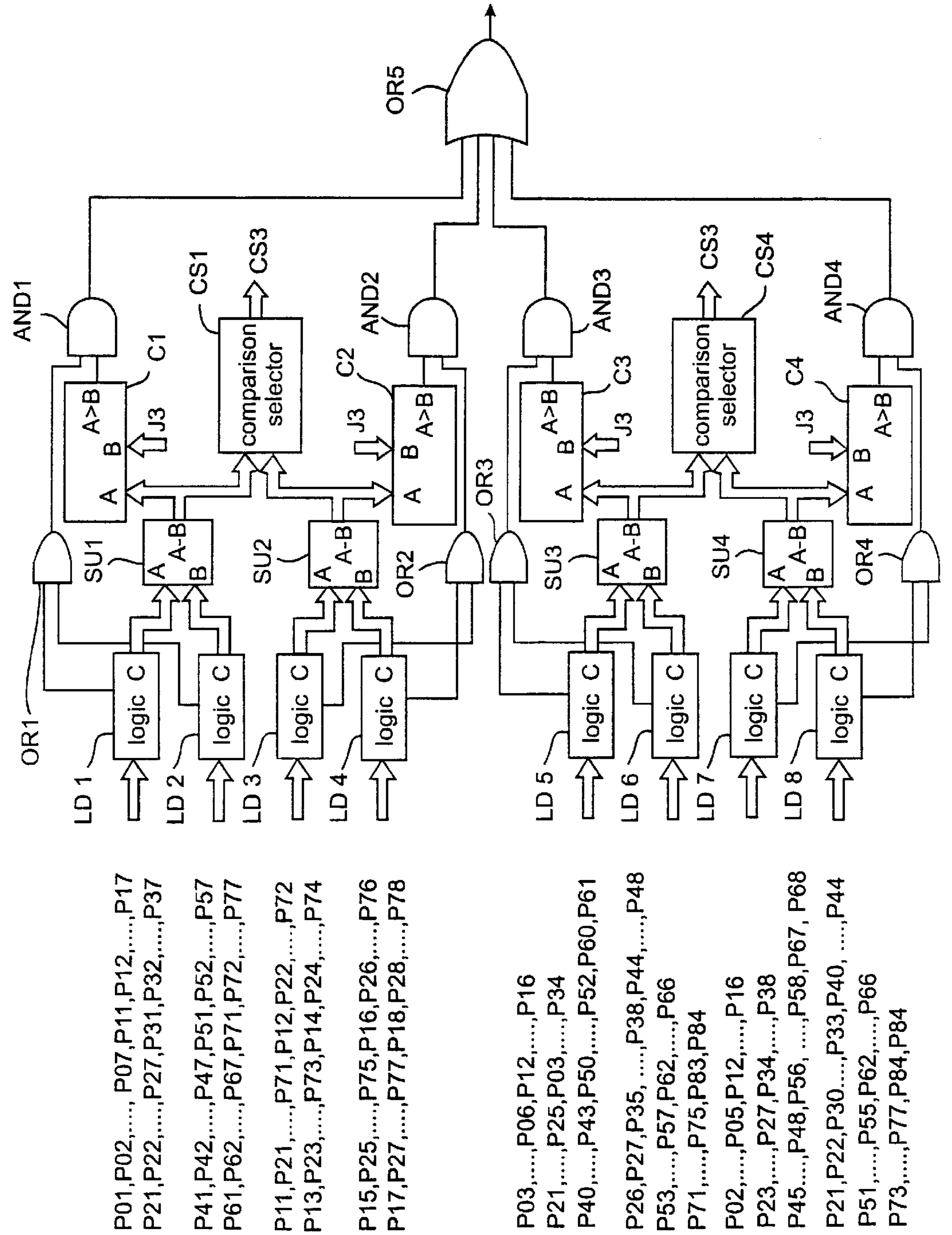
FIG. 42 is a block diagram of a part of edge region detection calculator.
Figure 43:
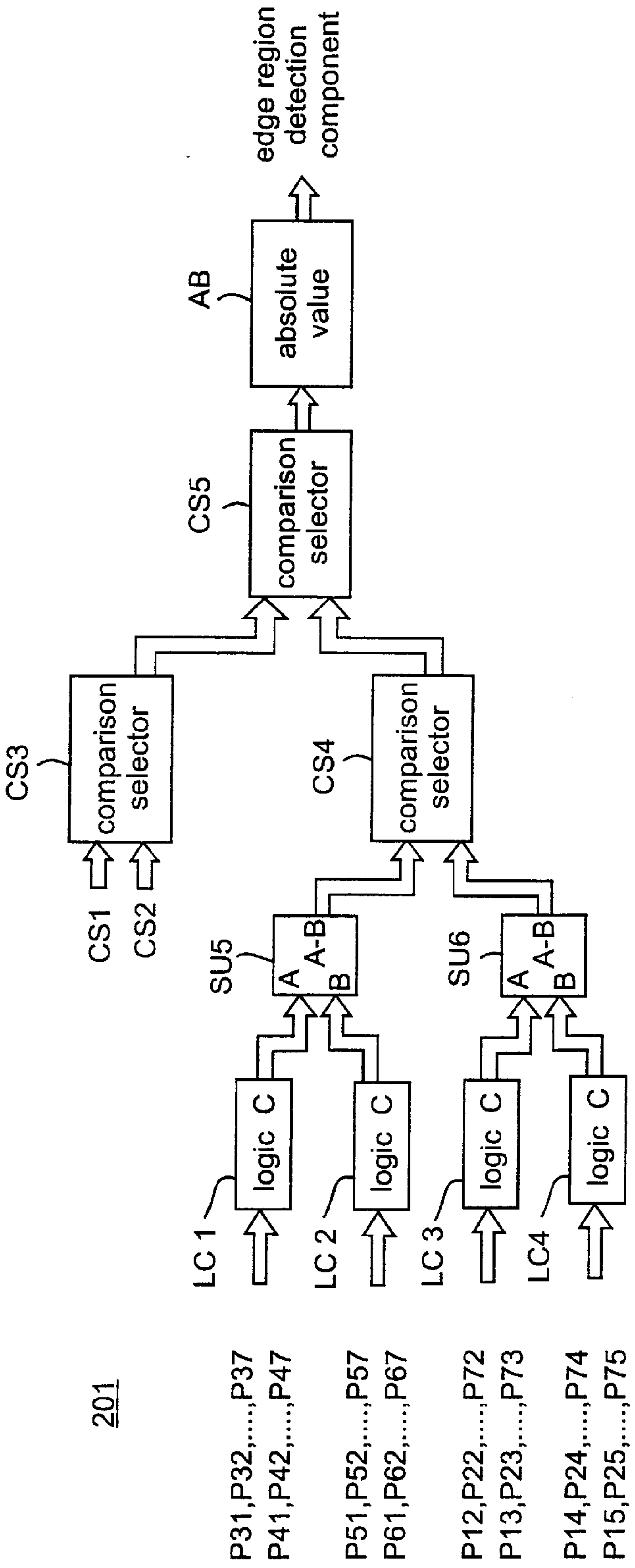
FIG. 43 is a block diagram of the other part of edge region detection calculator.

FIGS. 42 and 43 show a block diagram of the edge region detection calculator 201 which is provided for detecting the largest value of edge components for edge region detection. The edge region detection calculator 201 comprises eight logic D circuits LD1 to LD8 which perform the predetermined logical calculation (referred to as a logical D calculation hereinafter), four logic C circuits LC1 to LC4 which perform the predetermined logical calculation (referred to as a logical C calculation hereinafter), six subtracters SU1 to SU6, four comparators C1–C4, five comparison selector CS1 to CS5, an absolute value calculation circuit AB, a 4-input OR gate OR5, four OR gate OR1 to OR4 and four AND gates AND1 to AND4. As explained above, FIGS. 31–36 shows the twenty first to twenty sixth spatial filters. In the twenty first to twenty sixth spatial filters, the specified pixel exists at P44, or it is located at the center of a 9×9 region for calculating the edge emphasis amount.

The twenty first spatial filter shown in FIG. 31 is composed of the two logic D circuits LD1 and LD2 and the subtracter SU1, while the twenty second spatial filter shown in FIG. 32 is composed of the two logic D circuits LD3 and LD4 and the subtracter SU2. Further, the twenty third spatial filter shown in FIG. 33 is composed of the two logic D circuits LD5 and LD6 and the subtracter SU3, while the twenty fourth spatial filter shown in FIG. 34 is composed of the two logic D circuits LD7 and LD8 and the subtractor SU4. Further, the twenty fifth spatial filter shown in FIG. 35 is composed of the two logic C circuits LC1 and LC2 and the subtractor SU5, while the twenty sixth spatial filter shown in FIG. 36 is composed of the two logic D circuits LC3 and LC4 and the subtractor SU6.

This is explained in detail. The pixel data of 21 bits within the window W47*a* shown in FIG. 31 are inputted to the logic D circuit LD1, and then, data outputted from the logic D circuit LD1 are inputted to an input terminal A of the subtracter SUI. Further, the pixel data of 21 bits within the window W47 shown in FIGS. 31 are inputted to the logic D circuit LD2, and then, data outputted from the logic D circuit LD2 are inputted to an input terminal B of the subtracter SU1. Then, the data sent from the subtractor SU1 is inputted to the comparison selector CS1.

The pixel data of 21 bits within the window W74*a* shown in FIG. 32 are inputted to the logic D circuit LD3, and then, data outputted from the logic D circuit LD3 are inputted to an input terminal A of the subtracter SU2. Further, the pixel data of 21 bits within the window W74 shown in FIGS. 32 are inputted to the logic D circuit LD4, and then, data outputted from the logic D circuit LD4 are inputted to an input terminal B of the subtracter SU2. Then, the output data of the subtractor SU2 is inputted to the comparison selector CS2. Further, the data outputted from the comparison selector CS2 is inputted further to the comparison selector CS3.

The pixel data of 21 bits within the window Wa shown in FIG. 33 are inputted to the logic D circuit LD5, and then, data outputted from the logic D circuit LD5 are inputted to an input terminal A of the subtracter SU3. Further, the pixel data of 21 bits within the window W shown in FIGS. 33 are inputted to the logic D circuit LD6, and then, data outputted from the logic D circuit LD6 are inputted to an input terminal B of the subtracter SU3. Then, the output data from the subtractor SU43 is inputted to the comparison selector CS2.

The pixel data of 21 bits within the window Wa shown in FIG. 34 are inputted to the logic D circuit LD7, and then, data outputted from the logic D circuit LD7 are inputted to an input terminal A of the subtracter SU4. Further, the pixel data of 21 bits within the window W shown in FIG. 34 are inputted to the logic D circuit LD8, and then, data outputted from the logic D circuit LD8 are inputted to an input terminal B of the subtracter SU4. Further, the output data of the subtractor SU4 is inputted to the comparison selector CS2, and the output data of the comparison selector CS2 is inputted to the comparison selector CS3. The output data of the comparison selector CS3 is further sent to the comparison selector CS5.

The pixel data of 21 bits within the window Wa shown in FIG. 35 are inputted to the logic C circuit LC1, and then, data outputted from the logic C circuit LC1 are inputted to an input terminal A of the subtracter SU5. Further, the pixel data of 21 bits within the window W shown in FIGS. 35 are inputted to the logic C circuit LC2, and then, data outputted from the logic C circuit LC2 are inputted to an input terminal B of the subtracter SU5. Then, the output data from the subtractor SU5 is inputted to the comparison selector CS4.

The pixel data of 21 bits within the window Wa shown in FIG. 36 are inputted to the logic C circuit LC3, and then, data outputted from the logic C circuit LC3 are inputted to an input terminal A of the subtracter SU6. Further, the pixel data of 21 bits within the window W shown in FIGS. 36 are inputted to the logic C circuit LC4, and then, data outputted from the logic C circuit LC4 are inputted to an input terminal B of the subtracter SU6. Then, the output data from the subtractor SU6 is inputted to the comparison selector CS4. Further, the output data of the comparison selector CS4 is inputted to the comparison selector CS5.

That is, the comparison selectors CS1–CS5 select the largest among the edge amounts of the windows outputted by the subtractor SUB1–SUB6. The largest value is converted to an absolute value by the absolute value circuit AB1 and it is sent as an edge region detection component.

On the other hand, the edge region detection calculator 201 also detects a dashed line. Each logic D circuits LD1–LD8 send a signal, which means that all pixels in the window are white, via the OR gates OR1–OR4 to the AND gates AND1–AND4. On the other hand, the comparators C1–C4 compare the edge amount sent from the subtracters SU1–SU4 with the threshold value J3. If the pixels in either of a set of windows is all white and the edge amount is larger than J3, the AND gates AND1–AND 4 sends a dashed line detection signal via the 4-input OR gate OR5.

(5-3-2) First Edge Component Calculator

Figure 44:
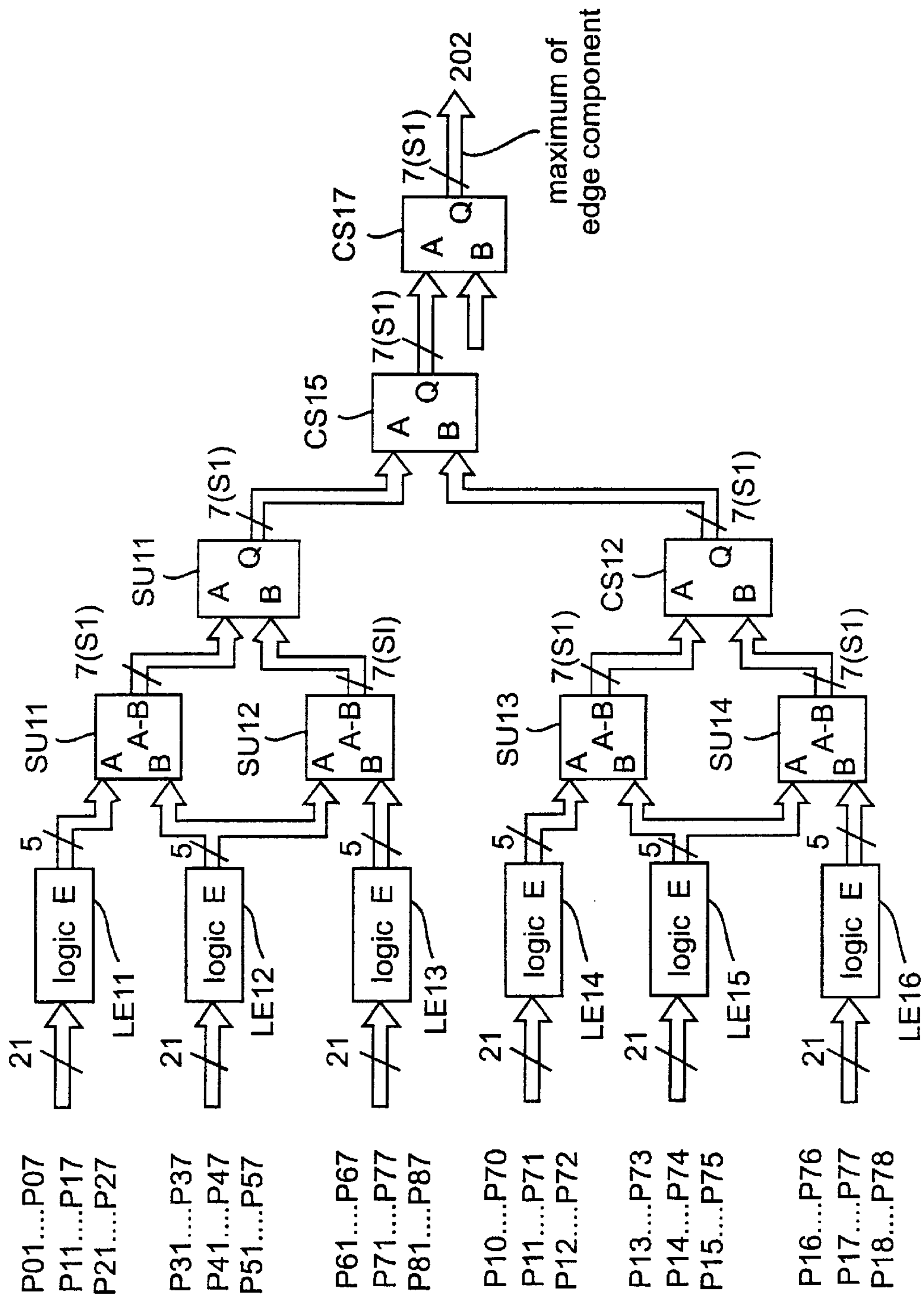
FIG. 44 is a block diagram of a part of first edge component calculator.
Figure 45:
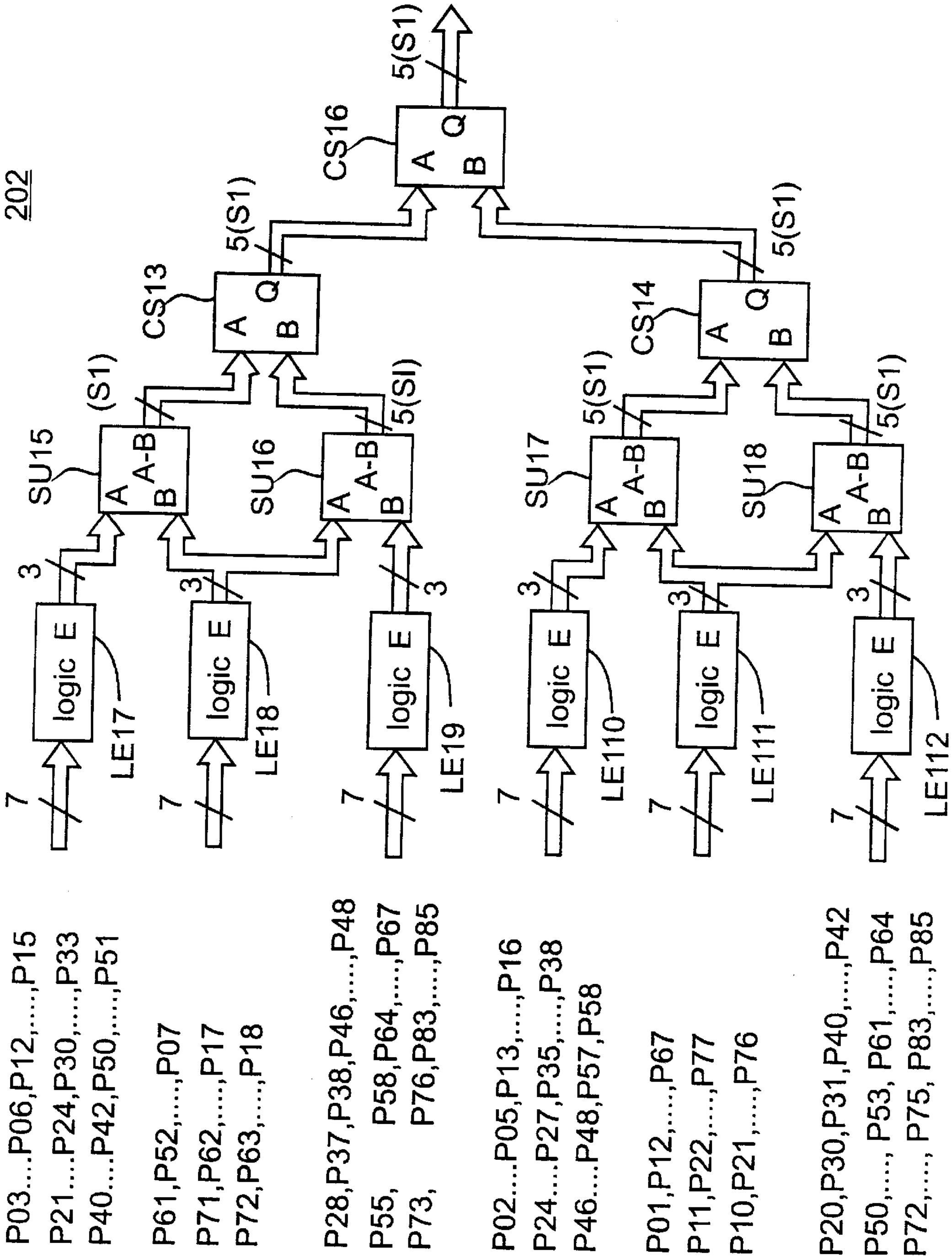
FIG. 45 is a block diagram of the other part of first edge component calculator.

FIGS. 44 and 45 show a block diagram of the first edge component calculator 202 which is provided for detecting the largest first judge amount by using the windows of width of three pixels shown in FIGS. 15–22 and sends it to the comparison selector 211. The first edge component calculator 202 comprises twelve logic E circuits LE1 to LE12 which performs the predetermined logical calculation (referred to as a logical E calculation hereinafter), eight subtracters SU11 to SU18and seven comparison selector CS11 to CS17.

Figure 15:
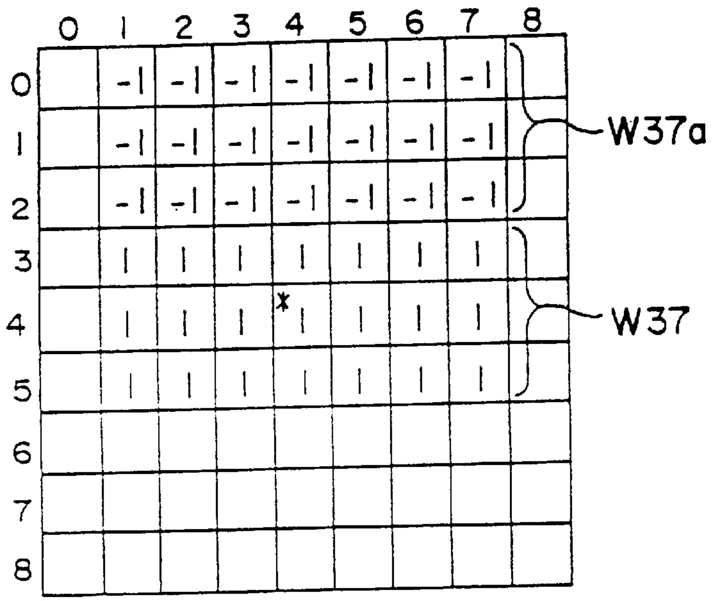
FIG. 15 is a diagram of a first spatial filter used for calculating edge emphasis amount.
Figure 16:
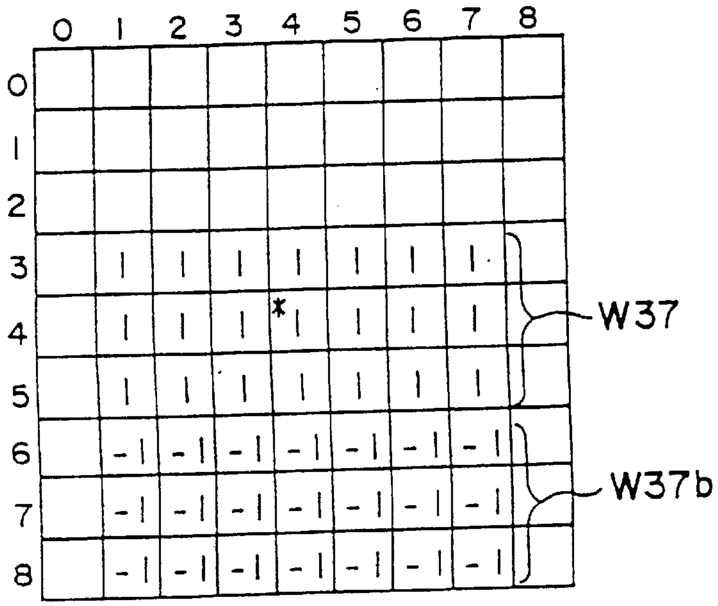
FIG. 16 is a diagram of a second spatial filter used for calculating edge emphasis amount.

As explained above, FIGS. 15–22 show the windows for detecting the first edge component. The first spatial filter shown in FIG. 15 is composed of the two logic E circuits LE1 and LE2 and the subtractor SU11, while the second spatial filter shown in FIG. 16 is composed of the two logic E circuits LE2 and LD3 and the subtractor SU12. Further, the third spatial filter shown in FIG. 17 is composed of the two logic E circuits LE14 and LE15 and the subtractor SU13, while the fourth spatial filter shown in FIG. 18 is composed of the two logic E circuits LE15 and LE16 and the subtractor SU14. Further, the fifth spatial filter shown in FIG. 19 is composed of the two logic E circuits LE17 and LE18 and the subtractor SU15, while the sixth spatial filter shown in FIG. 20 is composed of the two logic E circuits LE18 and LE19 and the subtractor SU16. Further, the seventh spatial filter shown in FIG. 21 is composed of the two logic E circuits LE110 and LE111 and the subtractor SU17, while the sixth spatial filter shown in FIG. 22 is composed of the two logic E circuits LE111 and LE112 and the subtractor SU18.

Each of a pair of the first spatial filter shown in FIG. 15 and the second spatial filter shown in FIG. 16 commonly uses a 3×7 window W37 for calculating a smoothed value, and is provided for detecting an edge component in the subscan direction. The first spatial filter is provided for performing a filtering process by subtracting a smoothed value of a 3×7 window W37*a* having the pixel P14 in the center thereof from a smoothed value of the 3×7 window W37 having the specified pixel P44 in the center thereof, and the second spatial filter is provided for performing a filtering process by subtracting a smoothed value of a 3×7 window W37*b* having the pixel P74 in the center thereof from the smoothed value of the 3×7 window W37. In order to perform the first edge component calculation, the logic E circuits LE1–LE3 calculate the number of black pixels in the windows W37*a*, W and W37*b*, and the subtracters SU1 and SU2 calculate the difference between the windows W37 and W37*a* and between the windows W37*b* and W37. Similar processing is performed for the other spatial filters shown in FIGS. 17–22.

The outputs of the subtracters SU11 and SU12 are inputted to the comparison selector CS11 which outputs the larger value. On the other hand, the outputs of the subtractors SU13 and SU14 are inputted to the comparison selector CS12 which outputs the larger value. Further, the outputs of the subtractors SU15 and SU16 are inputted to the comparison selector CS13 which outputs the larger value. The outputs of the two comparison selectors CS13 and CS14 are inputted to the comparison selector CS16 which sends the larger value and the outputs of the two comparison selectors CS15 and CS16 are inputted to the comparison selector CS17 which sends the larger value. Then, the largest edge component detected by the windows is outputted.

(5-3-3) Second Edge Component Calculator

Figure 46:
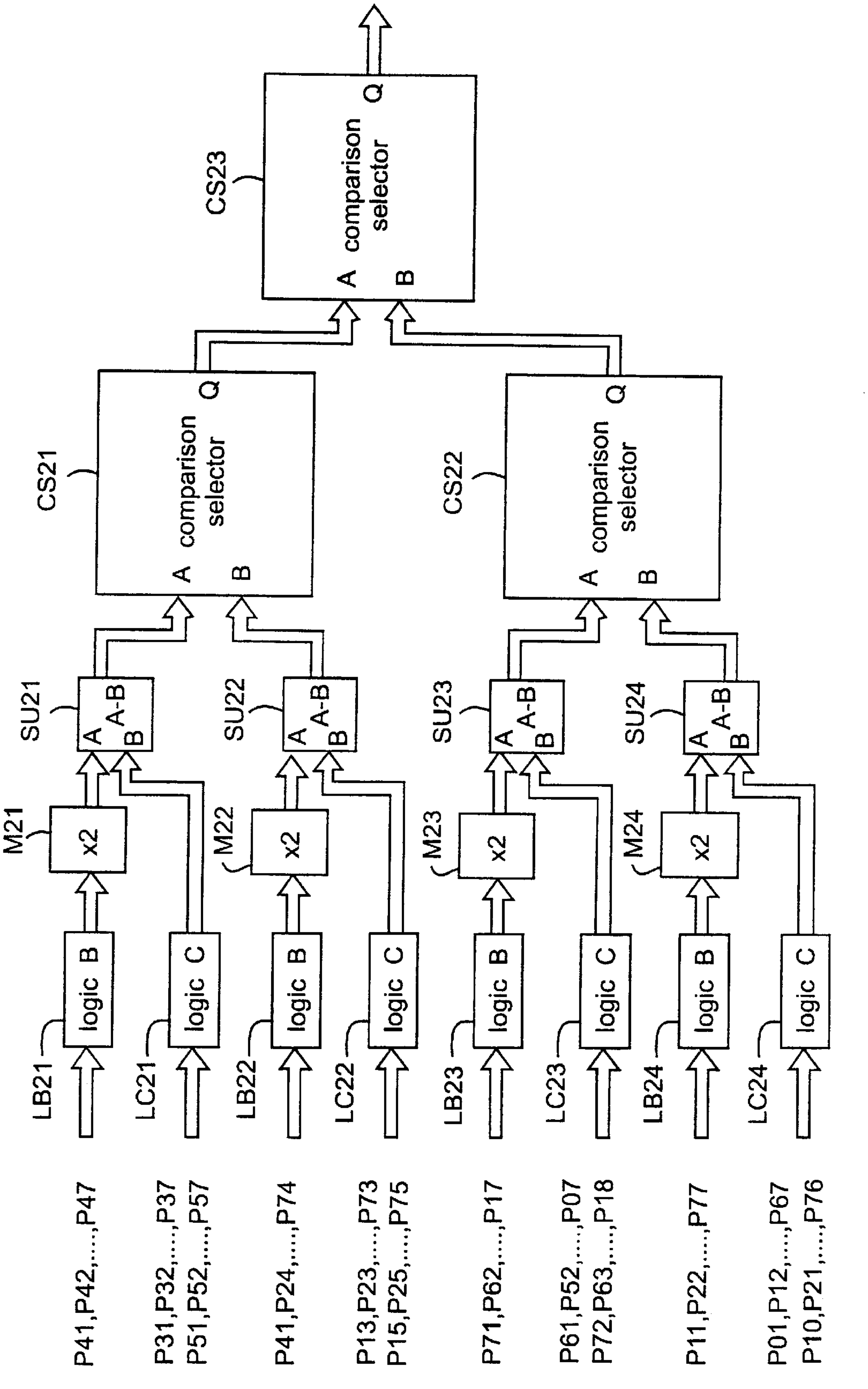
FIG. 46 is a block diagram of second edge component calculator.

FIG. 46 shows a block diagram of the second edge component calculator 203 which is provided for detecting the largest second judge amount by using the windows of width of one pixel shown in FIGS. 23–26, and sends a 7-bit data including a sign bit to the multiplying circuit 207. The output value is multiplied in the multiplying circuit 207 with a constant K1 and the result is sent to the comparison selector 211, while the output is also sent to the absolute value circuit 208 to send the absolute value to the comparator 209 (refer FIG. 39).

The second edge component calculator 203 comprises four logic B circuits LB21 to LB24 which perform the predetermined logical calculation (referred to as a logical B calculation hereinafter), four logic C circuits LC21–LC24, four doubling circuits M21–M24, four subtractors SU21 to SU24 and three comparison selectors CS21 to CS23.

As explained above, FIGS. 23–26 show the eleventh to sixteenth windows for detecting the second edge component of higher spatial frequencies. The specified pixel exists at P44 for the six spatial filters and it is located at the center of a 9×9 region for calculating the edge amount.

The eleventh spatial filter shown in FIG. 21 is composed of the two spatial filters shown in FIGS. 27 and 28. This calculation is performed in the second edge component calculator 203 by the logic B circuits LB21, the doubling circuit M21, the logic C circuit LC21 and the subtractor SU21. That is, logic B circuit LB21 calculates the number of black pixels in the portion denoted by "2" in the window, and the doubling circuit M21 doubles the output value of the logic B circuit LB21 in order to adjust the difference of the pixel numbers in the window. On the other hand, the logic C circuit LC21 calculates the number of black pixels in the portion denoted by "2" in the window. The subtractor SU21 calculates the difference of the two values to send it as an edge amount. That is, the logic B circuits LB21, the doubling circuit M21, the logic C circuit LC21 and the subtractor SU21 compose the twenty first spatial filter shown in FIG. 23. Similarly, the twenty second spatial filter shown in FIG. 24 is composed of the logic B circuits LB22, the doubling circuit M22, the logic C circuit LC22 and the subtractor SU22. The twenty third spatial filter shown in FIG. 25 is composed of the logic B circuits LB23, the doubling circuit M23, the logic C circuit LC23 and the subtractor SU23. The twenty fourth spatial filter shown in FIG. 26 is composed of the logic B circuits LB24, the doubling circuit M24, the logic C circuit LC24 and the subtractor SU24. As to the spatial filters shown in FIGS. 24–26, similar processing is performed.

The outputs of the subtractors SU21 and SU22 are inputted to the comparison selector CS21 to sent the larger value, while the outputs of the subtractors SU23 and SU24 are inputted to the comparison selector CS22 to send the larger value. The outputs of the selection selectors CS21 and CS22 are inputted to the comparison selector CS23 to send the larger value as the second edge component. Thus, the largest edge component detected by the windows of width of one pixel can be outputted.

(5-3-4) Logic B Circuit, Logic C Circuit, Logic D Circuit and Logic E Circuit

Figure 47:
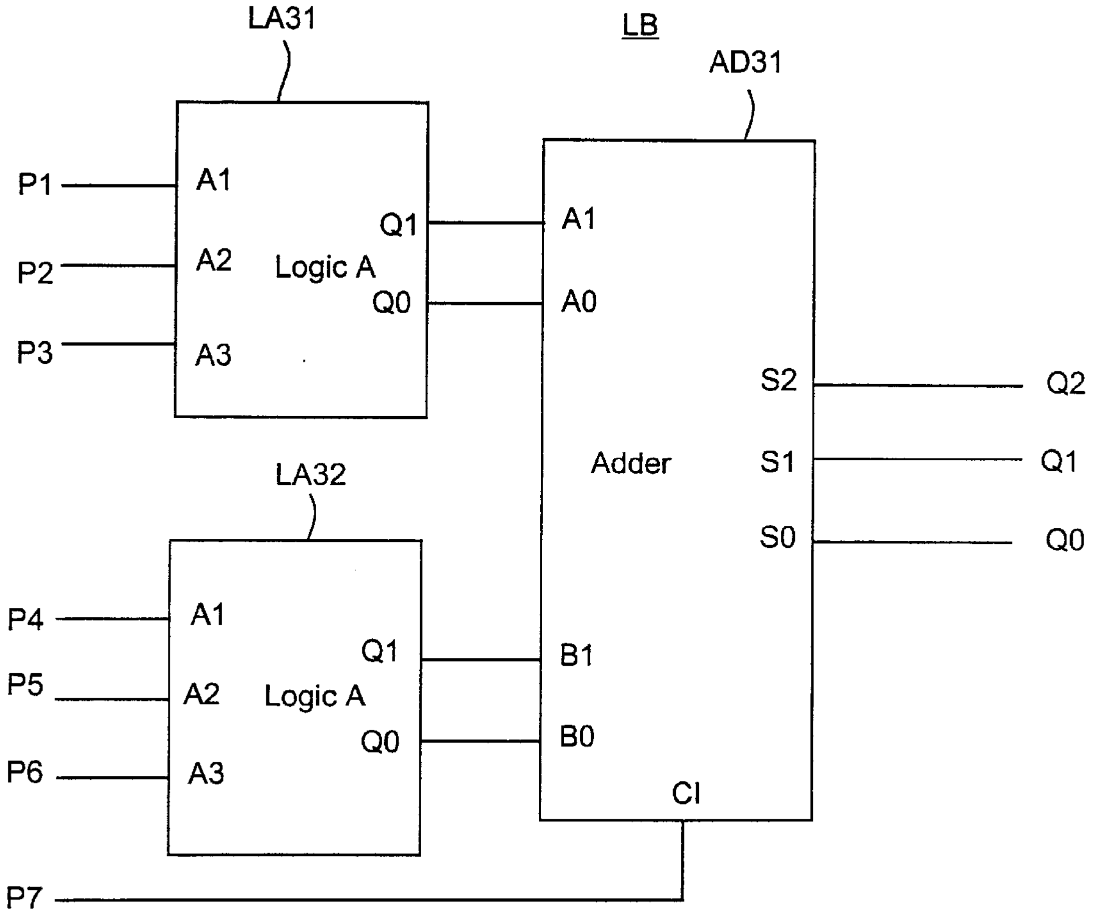
FIG. 47 is a block diagram of logic B circuit.

FIG. 47 shows the logic B circuit LB shown in FIG. 46. Referring to FIG. 47, the logic B circuit LB is provided for calculating the predetermined logic B calculation, and thereafter, outputting data of 3 bits Q1, Q2 and Q3 of the calculation result thereof for representing the number of bits of "1" or a black pixel in the inputted data of 7 bits, and comprises two logic A circuits LA1 and LA2 and an adder AD1. The two logic A circuits LA1 and LA2 each calculates a predetermined logic calculation represented by the following equations (2) and (3):

$$Q0 = A1 \cdot A2 \cdot A3 \vee \overline{A1} \cdot \overline{A2} \cdot A3 \vee A1 \cdot \overline{A2} \cdot \overline{A3} \vee \overline{A1} \cdot A2 \cdot \overline{A3} \qquad (2)$$

-continued $$Q1 = A1 \cdot A2 \cdot \overline{A3} \vee \overline{A1} \cdot A2 \cdot A3 \vee A1 \cdot \overline{A2} \cdot A3 \vee A1 \cdot A2 \cdot A3 = A1 \cdot A2 \vee A2 \cdot A3 \vee A3 \cdot A1 \quad (3)$$

Data P1 to P3 of the least significant 3 bits are inputted to the logic A circuit LA31, data P4 to P6 of the 3 bits higher from three bits of the data P1 to P3 are inputted to the logic A circuit LA32, and data P7 of the MSB of one bit are inputted to a carry-in terminal CI of the adder AD4. After each of the logic A circuits LA31 and LA32 performs the logic A calculation for the inputted data of 3 bits, data of 2 bits of the calculation result thereof are outputted to an adder AD31. The adder AD31 adds the inputted two data each data of 2 bits, and outputs data of 3 bits of the addition result thereof.

Figure 48:
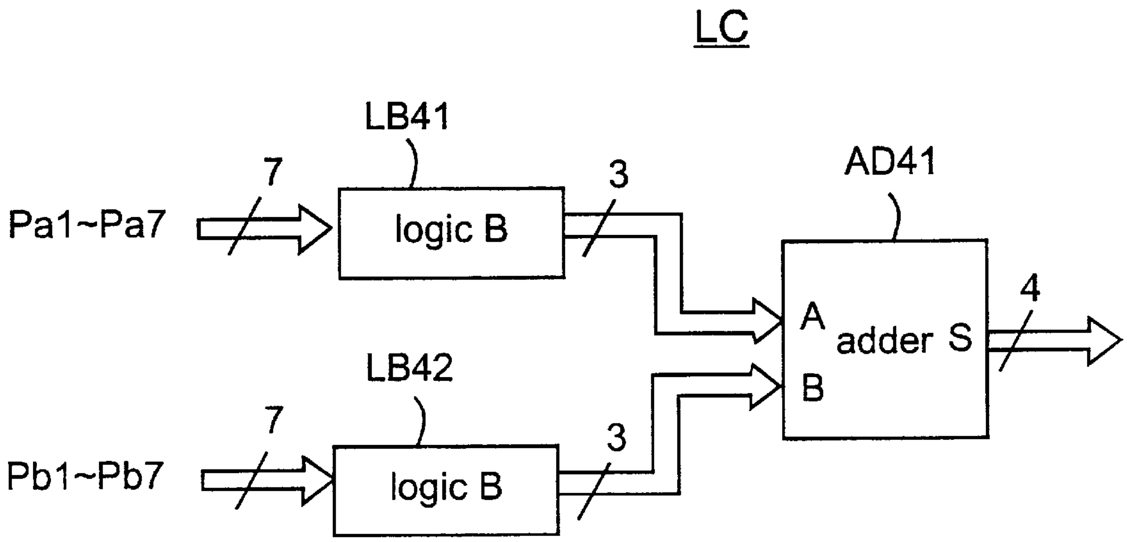
FIG. 48 is a schematic block diagram of logic C circuit.

FIG. 48 shows the logic C circuit LC shown in FIG. 43. The logic C circuit LC is provided for counting a bit number of "1" or black pixel within the inputted data of 14 bits, and comprises two logic B circuits LB41 and LB42 each having a structure shown in FIG. 47, and an adder AD41. Inputted data each of 7 bits are inputted to the logic B circuits LB41 and LB42, respectively, and the respective data outputted from the logic B circuits LB41 and LB42 are added to each other by the adder AD41, and then, the data of 4 bits of the addition result thereof are outputted as the data of the calculation result of the logic C circuit LC.

Figure 49:
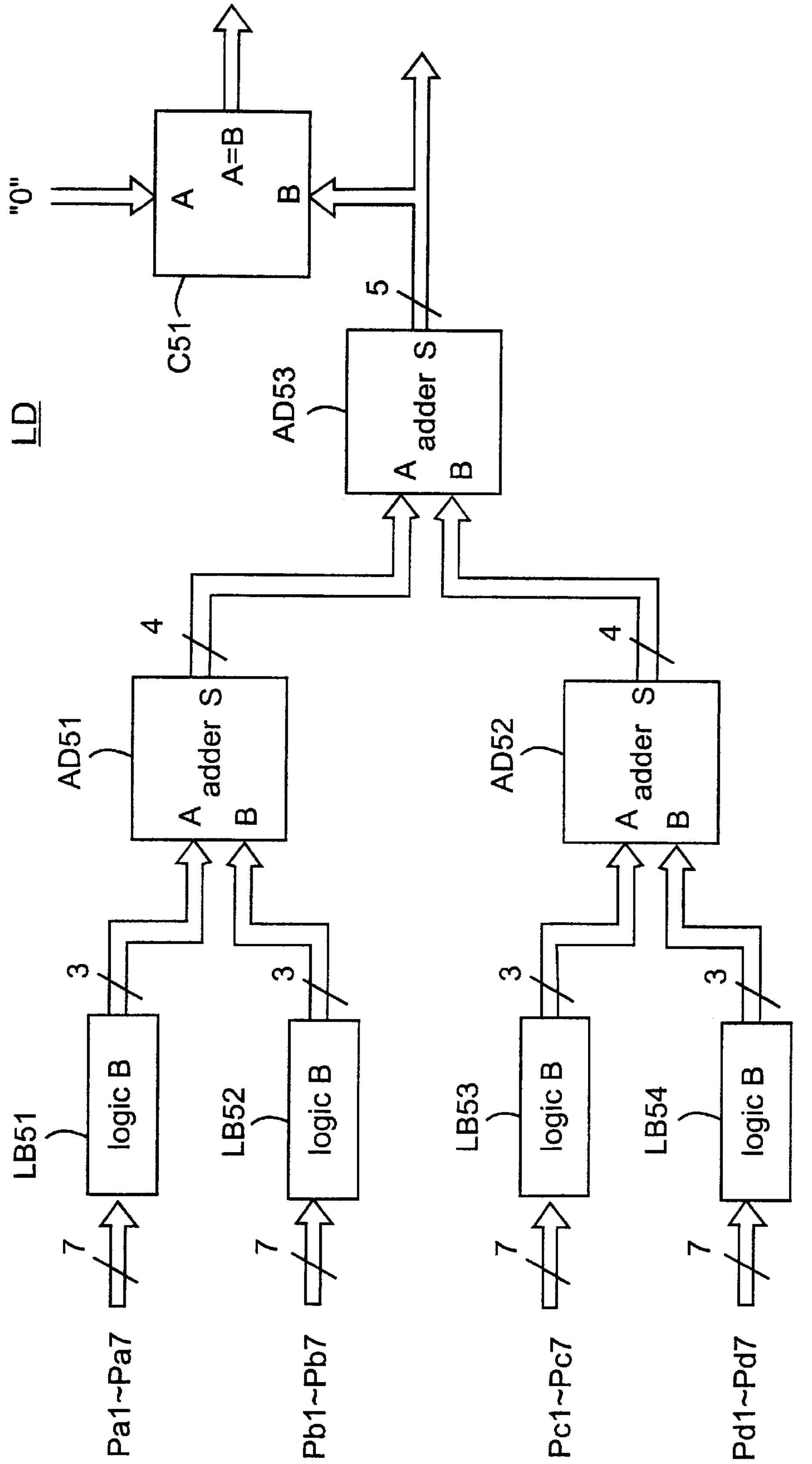
FIG. 49 is a schematic block diagram of logic D circuit.

FIG. 49 shows the logic D circuit LD shown in FIG. 42. The logic D circuit LD is provided for counting the number of bits of "1" or the black pixels within the inputted data of 21 bits. As shown in FIG. 49, the logic D circuit LD comprises three logic B circuits LB51 to LB54 each having a structure shown in FIG. 47, three adders AD51–AD53 and a comparator C51. Inputted data each of 7 bits are inputted to the logic B circuits LB51 to LB54, respectively, and 3-bit data the bit-number of "1" (black pixels) of 7-bit data obtained by the logic B circuits LB51 to LB54 are added by the adders AD51–AD53, and the data of 5 bits of the addition result thereof are outputted as 5-bit binary data, while the comparator C51 compared the result with "0" and sends the comparison result if all are white.

Figure 50:
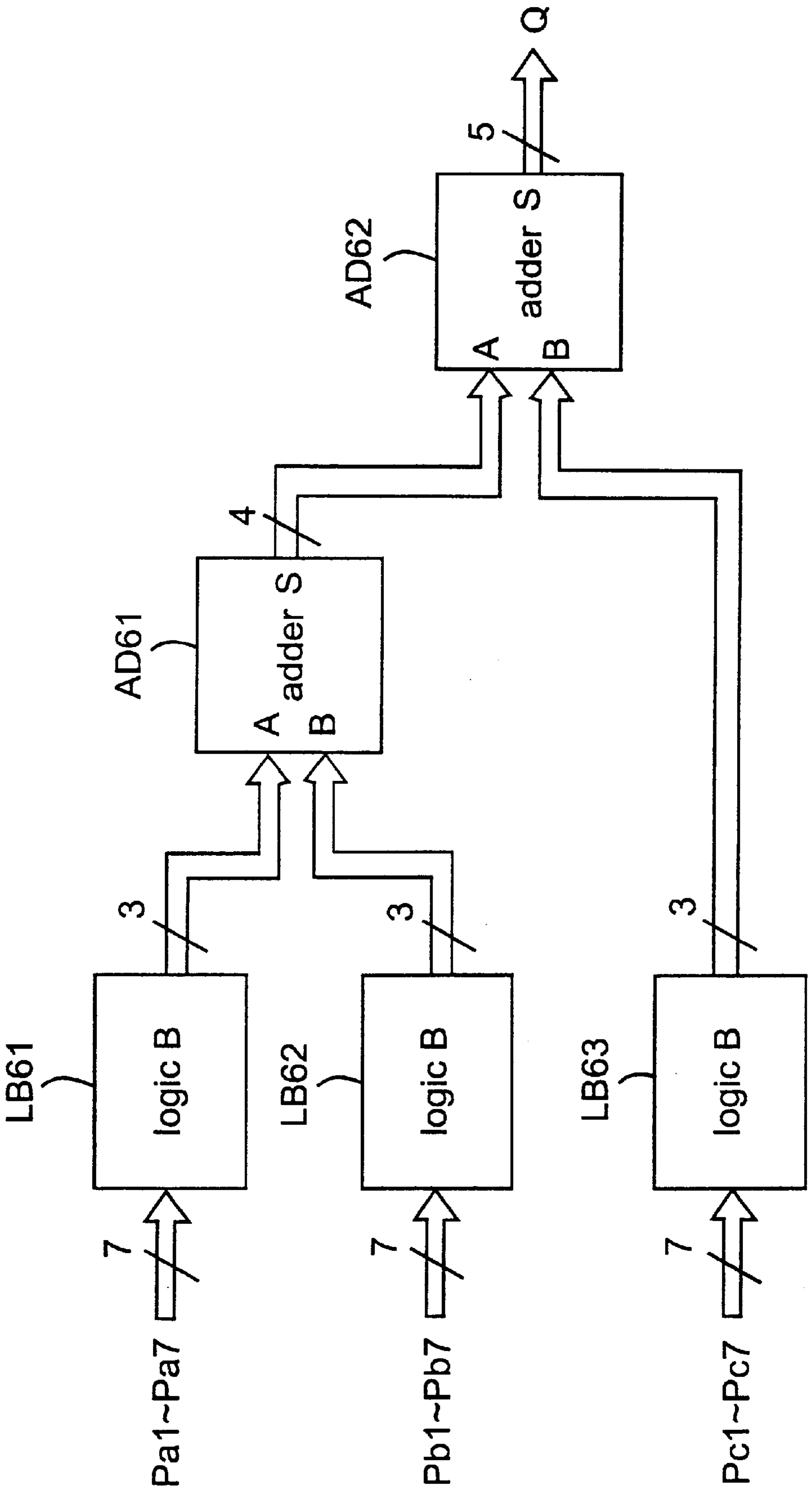
FIG. 50 is a block diagram of logic E circuit.

FIG. 50 shows the logic E circuit LE shown in FIGS. 44 and 45. The logic E circuit LE is provided for counting a bit number of "1" or black pixel within the inputted data of 7 bits of the logic B circuit LB61–LB63, and comprises three logic B circuits LB61 to LB63 each having a composition shown in FIG. 47, and two adders AD61 and AD62 . Inputted data each of 7 bits are inputted to the logic B circuits LB61 to LB64, respectively, and the respective data outputted from the logic B circuits LB61 to LB63 are added by the adders AD61 and AD62 , and then, the data of 5 bits of the addition result thereof are outputted.

(5-3-5) 3x3 Minority Pixels Detector Section

Figure 51:
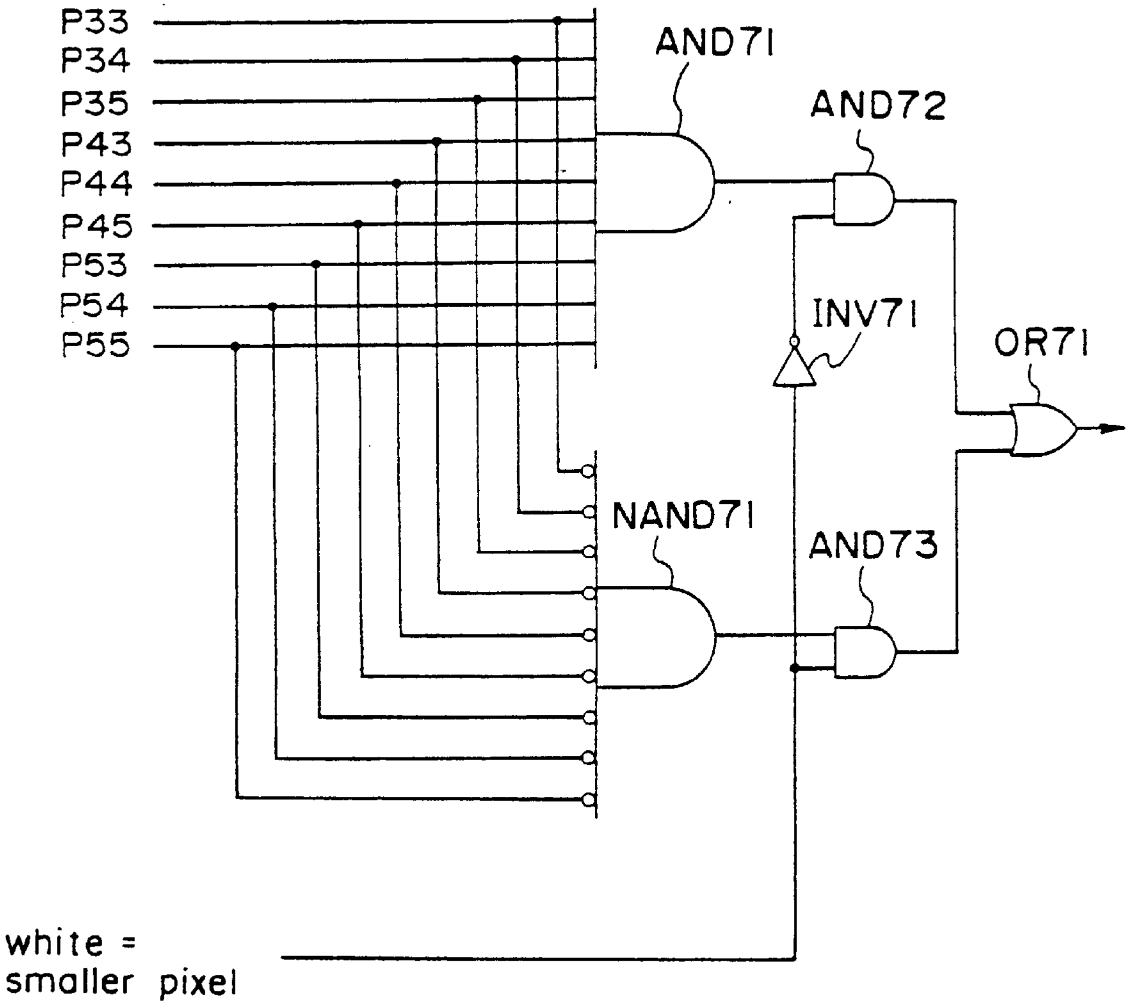
FIG. 51 is a block diagram of 3×3 minority pixel detector; and is

FIG. 51 shows a circuit diagram of the 3x3 minority pixels detector section 204, which comprises an AND gate AND71 and an NAND gate NAND71 both for receiving data of 3x3 =9 pixels, an NOR gate NOR71, an 2-input NOR gate NOR72, two AND gates AND72 and AND73, an inverter INV71 and an OR gate OR71. The AND gata AND71 sends a signal if all pixels are black, and if a signal showing that the black pixels are the minority pixels is received from the comparator 213, the AND gate AND72 sends the signal of the AND gate AND71 via the OR gate OR71 and through the OR gate 210 to the magnification circuit 207 in order to show that the minority pixels do not exist in 3x3 pixels. Similarly, the NOR gate NOR 71 sends a signal to the AND gate AND73 when all pixels are white, and if a signal showing that the white pixels are the minority pixels is received from the comparator 213, the AND gate AND73 sends the signal of the NAND gate NAND71 via the OR gate OR71 to the magnification circuit 207 in order to show that the minority pixels do not exist in 3x3 pixels.

(5-3-6) 7x7 Black Pixel Number Counting Circuit

Figure 52:
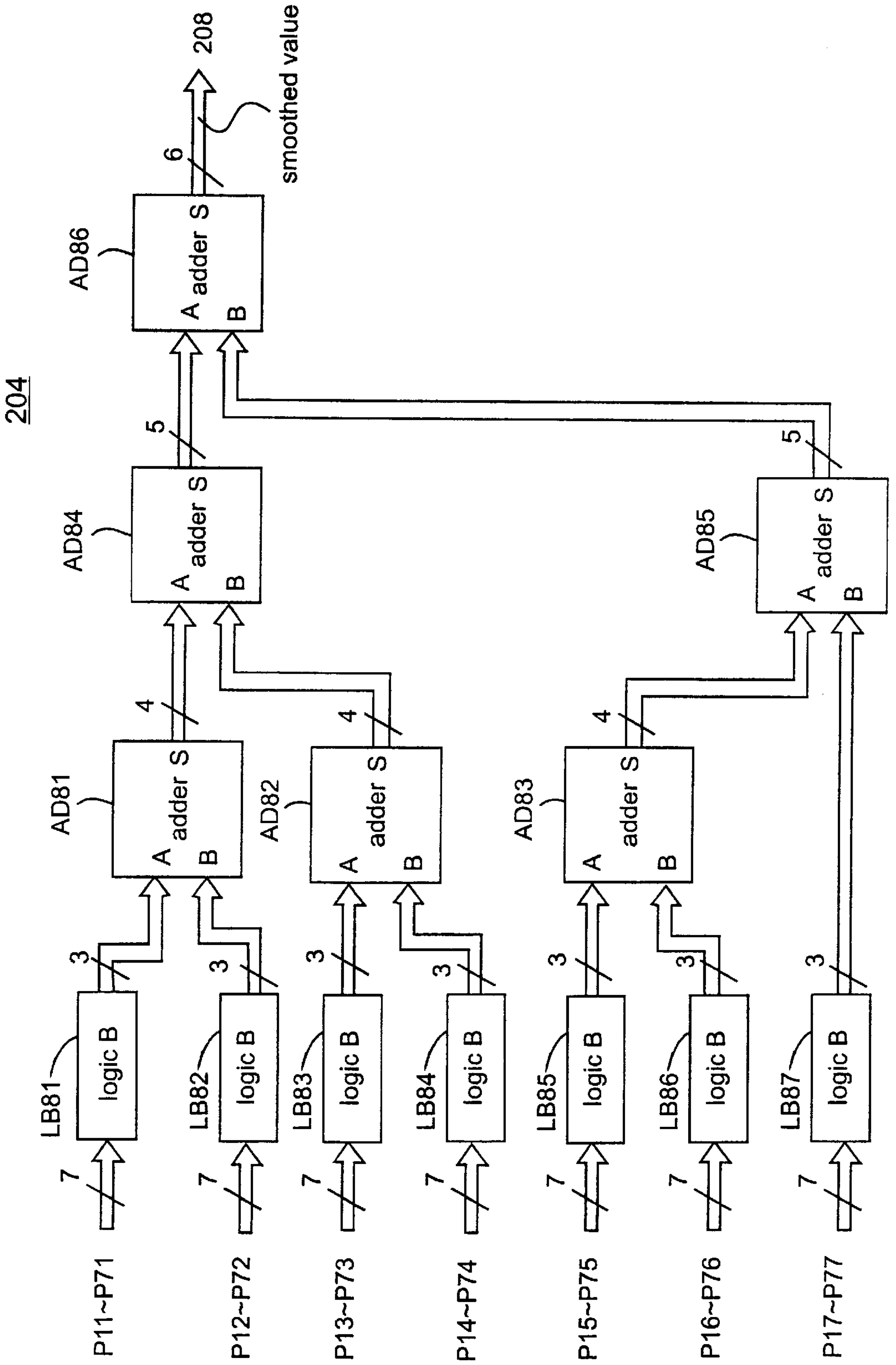
FIG. 52 is a block diagram of 7×7 black pixel counter.

FIG. 52 shows the 7x7 black pixel number counting circuit 204 shown in FIG. 6. Referring to FIG. 52, the pixel data P11 to P71 of 7 bits on the subscan line of j=1 outputted from the 9x9 matrix memory 100 are inputted to the logic B circuit LB81, the pixel data P12 to P72 of 7 bits on the subscan line of j=2 outputted from the 9x9 matrix memory 100 are inputted to the logic B circuit LB82, the pixel data P13 to P73 of 7 bits on the subscan line of j=3 outputted from the 9x9 matrix memory 100 are inputted to the logic B circuit LB83, and the pixel data P14 to P74 of 7 bits on the subscan line of j=4 outputted from the 9x9 matrix memory 100 are inputted to the logic B circuit LB84. Each of the logic B circuits LB81 to LB84 performs the above-mentioned logic B calculation for the inputted data, and then, outputs data of 3 bits of the calculation result thereof to the adders AD81 and AD82, respectively. Further, the pixel data P15 to P75 of 7 bits on the subscan line of j=5 are inputted to the logic B circuit LB85, the pixel data P16 to P76 of 7 bits on the subscan line of j=6 are inputted to the logic B circuit LB86, and the pixel data P17 to P77 of 7 bits on the subscan line of j=7 are inputted to the logic B circuit LB87. Each of the logic B circuits LB85 to LB87 performs the above-mentioned logic B calculation for the inputted data, and then, outputs data of 3 bits of the calculation result thereof to the adders AD83 and AD85. The data, each of 3 bits, outputted from the logic B circuit LB81 to LB87 are added to each other by the adders AD81 to AD86, and then, data of 6 bits of the addition result thereof are outputted as a smoothed value to the selector 208.

In the above-mentioned embodiments relates a facsimile apparatus. However, the present invention can also be applicable to a filing apparatus, a printer controller, an electronic sorter or the like. The electronic sorter is a sorter which make use of image data of a plurality of sheets of a documents are stored in a memory. By using the recovery technique of the present invention, image data can be stored as a format of bi-level image data, while the data can be printed as a multi-level image data. Further, a display of high resolution or a display of high gradation number can be used an output apparatus.

Further, the present embodiment is explained for a monochromatic image data. However, the present invention can also be applied to an image data of a plurality of colors. For example, bi-level image data of red, green and blue or of a part of the three colors can be recovered.

Further, in the present embodiment, bi-level image data is recovered to multi-level image data. However, the present invention can also be applied to the recovery from N-level image data to M-level image data, wherein N and M are natural numbers and $N<M$. It is clear that the processings in the image recovery processing section 62 can be used readily, while the image area judgement section can be constructed so that a similar processing is performed after the N-level image data is binarized.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor for restoring bi-level pixel data having black and white levels to multi-level pixel data comprising:

a first calculation means for counting a number of pixels in a window having a black level including a specified pixel to be decoded and other pixels to get a smoothing component;

second calculation means, having two sets of window pairs, for detecting an edge amount from a difference in the number of pixels having a black level between the windows, wherein one of the window sets has a pair of windows with a width of one pixel and another of the window sets has a pair of windows wider than said one window set; and restoring means for restoring the data for the specified pixel from bi-level to multi-level according to the smoothing component obtained by said fist calculation means and the edge component obtained by said second calculation means;

wherein said second calculation means has two groups of two sets of window pairs for detecting an edge component in a same direction but of opposite sides and has a window pair of a width of one pixel in the edge direction, and said second calculation means detects an edge component obtained by the windows of width of one pixel from the sum of edge components of the same direction but of opposite sides.

2. An image processor for recovering bi-level image data binarized as a pseudo half-tone image to multi-level image data, comprising:

first calculation means for counting a number of pixels in a first window including a specified pixel to be recovered and other pixels surrounding the specified pixel in the bi-level image data having a black level to get a smoothing component;

second calculation means for detecting an edge amount from a difference in the number of black pixels of two windows including the specified pixel and the other pixels surrounding the specified pixel in the bi-level image data; and recovery means for recovering a multi-level recovery image by mixing the smoothing component obtained by the first calculation means and the edge amount obtained by the second calculation means;

wherein when said first calculation means processes pixels within a maximum distance of N1 pixels from the specified pixel and said second calculation means processes pixels within a maximum distance of N2 pixels from the specified pixel, N1 is almost equal to N2.

3. An image processor for recovering bi-level image data binarized as a pseudo half-tone image to multi-level image data, comprising:

first count means for counting the number of prescribed image data included in a first region including first pixels surrounding a specified pixel to be recovered in the bi-level image data;

first judge means for judging whether the data of the first pixels included in the first region are the same;

second count means for counting the number of prescribed image data included in a second region including second pixels surrounding the specified pixel, which second pixels being not included in the first region surrounding a pixel in the bi-level image data;

second judge means for judging whether the data of the second pixels included in the second region are the same;

edge region judge means for detecting an edge region when the difference of the count numbers obtained by the first and second count means is larger than a prescribed value and the first or second judge means judges that the data of the pixels included in the first or second region are the same; and edge emphasizing means for processing the data of the pixel for emphasizing the density difference against the pixels surrounding the pixel when edge region is detected by said edge region judge means.

4. An image processor for recovering bi-level image data binarized as a pseudo half-tone image to multi-level image data, comprising:

first detection means for detecting a difference between the number of prescribed pixel data included in a first region including a specified pixel to be recovered and pixels surrounding the specified pixel in a prescribed first direction as to the specified pixel and the number of the prescribed pixel data included in a second region adjacent to the first region in a direction opposite to the prescribed first direction;

second detection means for detecting a difference between the number of prescribed pixel data included in a third region including the prescribed pixel and pixels surrounding the specified pixel in a prescribed second direction and the number of the prescribed pixel data included in a fourth region adjacent to the third region in a direction opposite to the prescribed second direction;

edge region judge means for detecting an edge region according to the detection results of the first and second detection means; and edge emphasizing means for processing the data of the specified pixel and for emphasizing the density difference against the pixels surrounding the pixel according to the edge detection result of said edge region judge means.

5. An image processor for restoring bi-level pixel data having low and high levels to multi-level pixel data comprising:

first sampling means for sampling a plurality of bi-level pixel data including data for a specified pixel to be decoded and other pixels surrounding the specified pixel in a first area of the image;

second sampling means for sampling a plurality of bi-level pixel data including data for pixels surrounding the specified pixel in a second area of the image which is smaller than the first area;

detection means for detecting an edge amount which corresponds to a density difference between the specified pixel and the other surrounding pixels in the first area in accordance with said pixel data sampled by said first sampling means;

first means for judging which of pixel data having a low level and having a high level is a minority of said pixel data sampled by said first sampling means;

second means for judging whether pixel data having the minority level are included in the pixel data sampled by said second sampling means and for making the detected edge amount invalid if the pixel data having the minority level are not included in the pixel data sampled by said second sampling means; and restoring means for restoring data for said specified pixel from bi-level pixel data to multi-level pixel data in accordance with said detected edge amount.

6. An image processor comprising:

a smoothing filter including a window for detecting a smoothing amount for image data of a specified pixel and other pixels surrounding said specified pixel;

a first edge detection filter including two sets of windows for detecting an edge amount for image data of a specified pixel and other pixels surrounding said specified pixel wherein said edge amount is detected from a difference in a number of black pixels of the two windows in each set of windows; and recovery means for recovering a bi-level image data binarized as a pseudo half-tone image to multi-level image data based on said detected smoothing amount and said detected edge amount.

7. The image processor according to claim 6, wherein a size of said two sets of windows included in said first edge detection filter is equal to a size of said window included in said smoothing filter.

8. The image processor according to claim 6, wherein a size of said two sets of windows included in said first edge detection filter corresponds to a width of one pixel including said specified pixels.

9. The image processor according to claim 8, wherein said first edge detection filter consists of a first window and a second window, a part of said first and second windows overlapping along said edge direction.

10. The image processor according to claim 6, wherein said window included in said smoothing filter has a number of pixels larger than the number of gradation stages of the multi-level image.

11. The image processor according to claim 10, wherein said window included in said smoothing filter has a size larger than an interval of a period of the bi-level image data of said pseudo half-tone image so as to prevent any shaded-off portion in a recovered image.

12. The image processor according to claim 6, wherein a center of each of said two sets of windows included in said first edge detection filter is located on said specified pixel.

13. The image processor according to claim 6, wherein each of the windows in the first edge detection filter includes a plurality of pixels.

14. An image processor comprising:

a smoothing filter including a window for detecting a smoothing amount for image data of a specified pixel and other pixels surrounding said specified pixel;

a first edge detection filter including two sets of windows for detecting an edge amount for image data of a specified pixel and other pixels surrounding said specified pixel;

recovery means for recovering a bi-level image data binarized as a pseudo half-tone image to multi-level image data based on said detected smoothing amount and said detected edge amount;

an adder which adds said detected smoothing amount and said detected edge amount; and wherein said recovery means recovers a bi-level image data binarized as a pseudo half-tone image to multi-level image data based on a result of a detection obtained by said adder.

15. An image processor comprising:

a smoothing filter including a window for detecting a smoothing amount for image data of a specified pixel and other pixels surrounding said specified pixel;

a first edge detecting filter including two sets of windows for detecting an edge amount for image data of a specified pixel and other pixels surrounding said specified pixel;

recovery means for recovering a bi-level image data binarized as a pseudo half-tone image to multi-level image data based on said detected smoothing amount and said detected edge amount;

a second edge detection filter including another two sets of windows for detecting edge amount for image data of said specified pixel and other pixels surrounding said specified pixel;

comparing means for comparing said edge amount detected by said first edge detection filter with said edge amount detected by said second edge detection filter; and setting means for setting a new edge amount based on a result of the comparing means.

16. The image processor according to claim 15, wherein a size of said windows included in said first edge detection filter is different from a size of said windows included in said second edge detection filter.

17. An image processor comprising:

a first edge detection filter including two sets of windows for detecting a first edge amount for image data of a specified pixel and other pixels surrounding said specified pixel;

a second edge detection filter including another two sets of windows for detecting a second edge amount for image data of said specified pixel and other second pixels surrounding said specified pixel;

edge amount detecting means for comparing said first edge amount with said second edge amount, and setting a new edge amount based on a result; and recovery means for recovering a bi-level image data binarized as a pseudo half-tone image to multi-level image data based on said new edge amount.

18. The image processor according to claim 17, wherein said first edge amount is detected from a difference in a number of black pixels of said two sets of windows included in said first edge detection filter.

19. The image processor according to claim 17, wherein said second edge amount is detected from a difference in a number of black pixels of said two sets of windows included in said second edge detection filter.

20. The image processor according to claim 17, wherein a size of said two sets of windows included in said first edge detection filter corresponds to a width of one pixel including said specified pixels.

21. The image processor according to claim 17, wherein a size of said two sets of windows included in said second edge detection filter corresponds to a width of one pixel including said specified pixels.

22. The image processor according to claim 17, wherein a center of each of said two sets of windows included in said first edge detection filter is located on said specified pixel.

23. The image processor according to claim 17, wherein a center of each of said two sets of windows included in said second edge detection filter is located on said specified pixel.

24. The image processor according to claim 17, wherein a size of said windows included in said first edge detection filter is different from a size of said windows included in said second edge detection filter.

25. An image processor comprising:

a first edge area detection filter including first and second windows for detecting a first edge area for image data of a specified pixel and other pixels surrounding said specified pixel, said first window including said specified pixel and first pixels surrounding said specified pixel in a first direction, said second window including second pixels surrounding said specified pixel in a second direction opposite to said first direction, said second window being adjacent to said first window;

a second edge area detection filter having third and fourth windows for detecting a second edge area for image data of a specified pixel and other pixels surrounding said specified pixel, said third window including said specified pixel and third pixels surrounding said specified pixel in a third direction, said fourth window including fourth pixels surrounding said specified pixel in a fourth direction opposite to said third direction, said fourth window being adjacent to said third window;

first detection means for detecting a first difference between a number of prescribed pixel data included in said first window and said second window;

second detection means for detecting a second difference between a number of prescribed pixel data included in said third window and said fourth window;

comparing means for comparing said first difference with said second difference;

edge area judging means for judging a third edge area based on a result of a comparison; and recovery means for recovering a bi-level image data binarized as a pseudo half-tone image to multi-level image data based on said third edge area judged by said edge judging means.

26. The image processor according to claim 25, wherein a size of said first and second windows is different from a size of said third and fourth windows so as to prevent an error in detection of edge area.

27. The image processor according to claim 25, wherein a specified pixel is located in said first window at a side adjacent to said second window.

28. The image processor according to claim 25, wherein a specified pixel is located in said third window at a side adjacent to said fourth window.

29. The image processor according to claim 25, wherein when said number of pixel included in said first window or said second window is smaller than a first predetermined value, a result of said detection of said first detection means is cleared so as not to conduct an edge emphasis processing.

30. The image processor according to claim 29, wherein image data of said specified pixel is judged as a dashed line, when said number of pixels included in said first window or said second window exceeds a second predetermined value smaller than said first predetermined value and all pixels in said first window or said second window are the same.

31. The image processor according to claim 25, wherein when said number of pixels included in said third window or said fourth window is smaller than a first predetermined value, a result of said detection of said second detection means is cleared so as not to conduct an edge emphasis processing.

32. The image processor according to claim 31, wherein image data of said specified pixel is judged as a dashed line, when said number of pixels included in said third window or said fourth window exceeds a second predetermined value smaller than said first predetermined value and all pixels of said third window or said fourth window are the same.

* * * * *